(12) United States Patent
Monica et al.

(10) Patent No.: US 8,494,165 B1
(45) Date of Patent: Jul. 23, 2013

(54) SECURE COMMUNICATIONS BETWEEN DEVICES USING A TRUSTED SERVER

(75) Inventors: Diogo Monica, San Francisco, CA (US); Shawn Morel, San Francisco, CA (US)

(73) Assignee: Square, Inc., San Francisco, CA (US)

(*) Notice: Subject to any disclaimer, the term of this patent is extended or adjusted under 35 U.S.C. 154(b) by 0 days.

(21) Appl. No.: 13/353,156

(22) Filed: Jan. 18, 2012

(51) Int. Cl.
*H04K 1/00* (2006.01)
*H04L 9/00* (2006.01)

(52) U.S. Cl.
USPC ............ 380/270; 713/168; 713/169; 713/170

(58) Field of Classification Search
USPC .... 380/270, 277, 282, 284–285, 44; 713/156, 713/158, 168–171, 173, 178; 726/2–6, 10
See application file for complete search history.

(56) References Cited

U.S. PATENT DOCUMENTS

| | | | | |
|---|---|---|---|---|
| 7,302,564 | B2* | 11/2007 | Berlin | 713/151 |
| 7,788,491 | B1* | 8/2010 | Dawson | 713/168 |
| 2010/0017602 | A1* | 1/2010 | Bussard et al. | 713/168 |

* cited by examiner

*Primary Examiner* — Hosuk Song
(74) *Attorney, Agent, or Firm* — Fish & Richarson P.C.

(57) ABSTRACT

A method of establishing secure communication between a first mobile computing device and a second mobile computing device includes receiving a first request from the first mobile computing device to securely communicate with the second mobile computing device via a Wi Fi hot spot, verifying that the first mobile computing device is trusted, generating a public key and a private key based on a trusted certificate, sending the private key to the first mobile computing device via the Wi-Fi hot spot, receiving a second request from the second mobile computing device to securely communicate with the first mobile computing device, verifying that the second mobile computing device is trusted, and sending the public key to the second mobile computing device.

28 Claims, 20 Drawing Sheets

| | | |
|---|---|---|
| 1 | 2 | 3 |
| 4 | 5 | 6 |
| 7 | 8 | 9 |
| | 0 | ⬇ |

Enter in Pin:

Enter in the following Pin at the other device: 12345

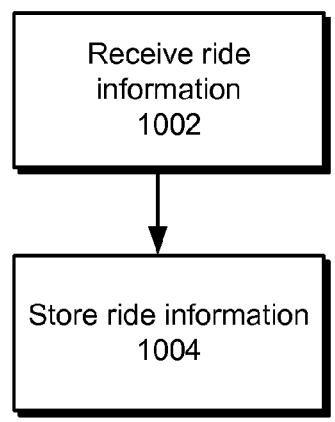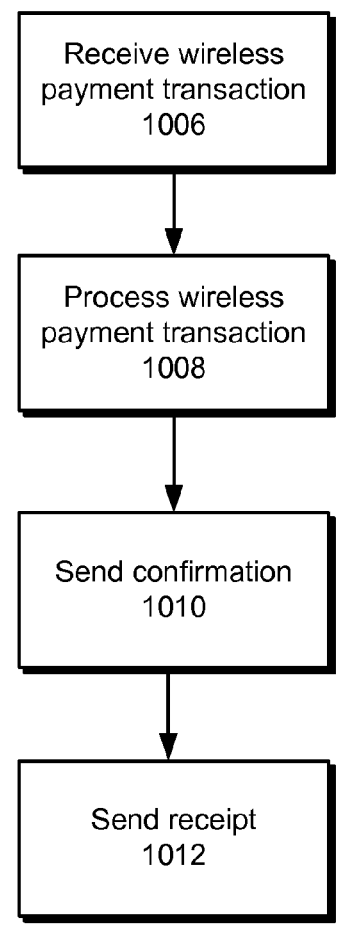
FIG. 10A
FIG. 10B

How much would you like to tip? 1302

| 0% | 10% | 15% | 20% | ⋮ |
| $0 | $2.00 | $3.00 | $4.00 | More |

SECURE COMMUNICATIONS BETWEEN DEVICES USING A TRUSTED SERVER

TECHNICAL FIELD

This disclosure relates to mobile card processing using multiple wireless devices, to acquisition of card information to enhance user experience, and to secure communications between devices.

BACKGROUND

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

Mobile card readers are available. Some mobile card readers use WiFi technology to communicate with the credit card processor via a wireless network access point. Some mobile card readers, e.g., in taxies, use cellular technology to communicate wirelessly with the credit card processor.

SUMMARY

Although mobile card readers are available, e.g., in taxies, such systems are often expensive, difficult to install, or do not significantly enhance the user experience. This specification relates to technologies that allow devices to securely communicate with each other, e.g., via a WiFi hotspot.

According to one aspect of the subject matter described in this specification, different aspects of card transaction can be divided between different mobile devices. For example, one mobile device can receive transaction details, e.g., as received from a merchant or from a meter in a taxi, whereas a customer can swipe a card and approve the transaction on another mobile device. The devices communicate wirelessly with each other on a wireless network, e.g., a WiFi hotspot, and can communicate with a payment service system, e.g., over the Internet via the WiFi hotspot. Secure communication can be established between the mobile devices on the wireless network without necessarily having access to an external network, e.g., the Internet. Secure communication between mobile card readers, mobile devices, and a payment processing system can be established and maintained throughout processing of the transaction. Thus a customer can securely conduct a distributed payment transaction even though multiple mobile devices are employed. Card information obtained from the swipe can be used to enhance the user experience, e.g., by displaying targeted advertising on one of the mobile devices.

In one aspect, a method of establishing secure communication between a first mobile computing device and a second mobile computing device includes connecting the first mobile computing device to a server via the Wi Fi hot spot, authenticating the first mobile computing device with the server, verifying that the server has a trusted certificate, sending a request to the server to securely communicate with the second mobile computing device that is connected to the Wi Fi hot spot, sending the request to the second mobile computing device through the Wi-Fi hot spot, receiving a private key from the server, receiving data including a session key, the session key being encrypted, decrypting the data using the private key to obtain the session key, and establishing secure communication between the first mobile computing device and the second mobile computing device through the Wi Fi hot spot, wherein establishing secure communication includes encrypting transmissions from the first mobile computing device using the session key and decrypting received transmissions from second mobile computing device using the session key.

Implementations may include one or more of the following features. Sending the request to the server may include sending a geographic location, current timestamp, a random number, or unique identification of the first mobile computing device. Authenticating the first mobile computing device with the server may include authenticating by the first mobile computing device logging into the server. A list of mobile computing devices connected to the Wi Fi hot spot may be received in the first mobile computing device. The session key may expire after a predetermined amount of time. The session key may expire when a mobile device connected to the Wi Fi hot spot is disconnected. The mobile computing devices and Wi Fi hot spot are in a vehicle or in the same business establishment, e.g., a restaurant. The trusted certificate may be a Transport Layer Security (TLS) certificate.

In another aspect, a method of establishing secure communication between a first mobile computing device and a second mobile computing device, includes receiving a first request from the first mobile computing device to securely communicate with the second mobile computing device via a Wi Fi hot spot, verifying that the first mobile computing device is trusted, generating a public key and a private key based on a trusted certificate, sending the private key to the first mobile computing device via the Wi-Fi hot spot, receiving a second request from the second mobile computing device to securely communicate with the first mobile computing device, verifying that the second mobile computing device is trusted, and sending the public key to the second mobile computing device.

Implementations may include one or more of the following features. Verifying that the first mobile computing device is trusted may include determining the first mobile computing device has established a session with the server. After verifying that the second mobile computing device is trusted, the second mobile computing device may join the session. Verifying that the second mobile computing device is trusted may include determining the distance between the first mobile computing device and the second mobile computing device is within a predetermined distance. Verifying that the second mobile computing device is trusted may include determining a first unique identification of the first mobile computing device exists in a database. The trusted certificate may be a TLS certificate. The public or private key may expire after a predetermined amount of time. The public or private key may expire when the first mobile computing device or the second mobile computing device disconnect from the Wi Fi hot spot. The first request may include first metadata indicating a location, a timestamp, a random number, or a unique identification, and the second request may include second metadata matching the first metadata.

In another aspect, a method of establishing secure communication between a first mobile computing device and a second mobile computing device includes receiving a request from the first mobile computing device to securely communicate with the second mobile computing device via a Wi Fi hot spot, sending the request to a server via the Wi-Fi hot spot, verifying that the server has a trusted certificate, receiving a public key from the server, generating a session key, encrypting the session key with the public key, sending the encrypted key to the first mobile computing device via the Wi-Fi hot spot, and establishing secure communication between the first mobile computing device and the second mobile computing device through the Wi-Fi hot spot, wherein establishing secure communication includes encrypting transmissions from the second mobile computing device using the session key and decrypting received transmissions from first mobile computing devices using the session key.

Implementations may include one or more of the following features. The request may include a geographic location, current timestamp, a random number, or unique identification of the first mobile computing device. The session key may expire after a predetermined amount of time. The session key may expires when a mobile device connected to the Wi Fi hot spot is disconnected. The mobile computing devices and Wi-Fi hot spot may be in a vehicle, or in the same business establishment, e.g., a restaurant. The trusted certificate may be a Transport Layer Security (TLS) certificate.

In another aspect, a computer program product, tangibly encoded in a non-transitory computer readable media, includes instructions for causing a processor to perform the methods above.

Advantages may include one or more of the following. A customer can conduct a point-of-sale electronic payment transaction with a merchant without giving the merchant a card. Instead, the customer can conduct a transaction by personally swiping a card. The customer can swipe a card on a mobile device that is wirelessly connected to other devices, enabling the customer to pay at physical locations convenient to the customer. A merchant-facing device can wirelessly and securely send transaction details to a customer-facing device that can process a swipe of a customer's card. In addition, the customer can swipe a card before receiving transaction details and can be provided with a personalized experience by a merchant or another third party. For example, if the customer swipes a card in a taxi on a customer-facing device, the customer-facing device can display the previous destinations of the customer.

BRIEF DESCRIPTION OF THE DRAWINGS

FIGS. 3A and 3B are views of example graphical user interfaces for two mobile devices.

FIG. 10A is a flow chart of an example process conducted by a computer system of a dispatch service.

FIG. 10B is a flow chart of an example process conducted by a payment service system.

FIGS. 12A-17 are example views displayed by a customer application on the mobile device.

Like reference numbers and designations in the various drawings indicate like elements.

DETAILED DESCRIPTION

Establishing secure communication between devices is useful for many applications, e.g., mobile card processing applications, distributed payment transaction applications, or applications that exchange personally-identifiable information such as a social network application, a chat client, or a file exchange application. By way of illustration, in mobile card processing, if various functions are to be divided between different mobile devices, the transaction may require a secure transfer of confidential information, e.g., a card number, between the mobile devices. Secure communication can be established in two different implementations: 1) by a pairing process in conjunction with a comparison of public keys, or 2) by a trusted server. FIGS. 1-4 concern establishing secure communication through a pairing process in conjunction with a comparison of public keys codes. FIGS. 5-8 concern establishing secure communication through a trusted server.

By having secure communication between devices, information can confidently be exchanged without fear of fraud or theft. In addition, devices can communicate in a secure manner without communicating through an external network, e.g., the Internet. By avoiding the Internet, the devices can quickly, reliably, and securely communicate with each other without relying on the availability or speed of an Internet connection.

Figure 1:
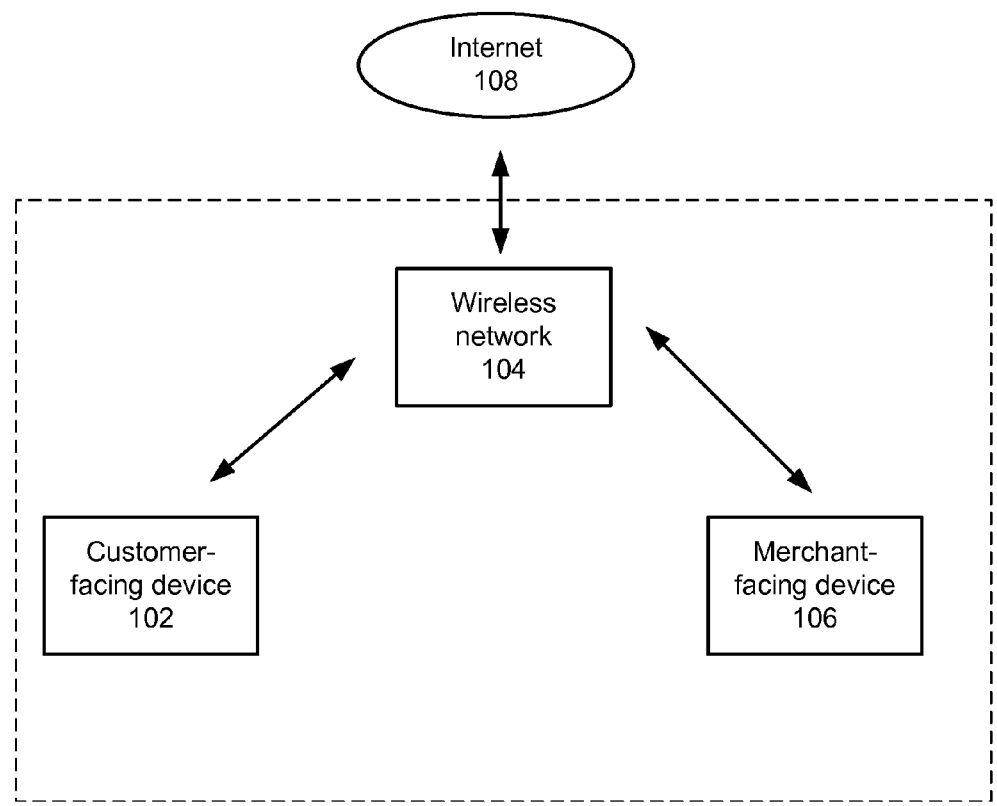
FIG. 1 is a schematic illustration of an example system for communication between mobile devices over a wireless network.

FIG. 1 is a schematic illustration of an example system 100 for communication between mobile devices over a wireless network. The system 100 shown in FIG. 1 is an example of a system that can be configured to establish secure communication between mobile devices over a wireless network using a pairing process in conjunction with a comparison of public keys. The system 100 includes a first mobile device 102 and a second mobile device 106 that can communicate over wireless network 104. The system 100 can also include additional mobile devices. The system 100 and the wireless network 104 can be connected to an external network, e.g., the Internet 108. For example, the wireless network 104 can be a WiFi hot spot that includes a wireless access point for wireless connection to the mobile devices 102 and 106. The wireless network 104 can also include a wired or cellular, e.g., 3G or 4G, connection the Internet 108. Alternatively or in addition, one or both of the mobile devices 102, 106 could have a wireless connection to the Internet, e.g., over a cell network. However, the Internet 108 is not needed for the two devices 102 and 106 to establish secure communications. The two devices 102 and 106 can establish secure communication solely through the wireless network 104. Establishing secure communications through a pairing process and a comparison of public keys can be implemented with more than two devices.

In some implementations, described further below, the first device 102 serves as a customer-facing device, and the second device 106 serves as a merchant-facing device 106. A "customer facing" device is a device that is configured with applications to display messages to and receive input from the customer. A "merchant facing" device is a device that is configured with applications to display messages to and receive input from the merchant.

Figure 2A:
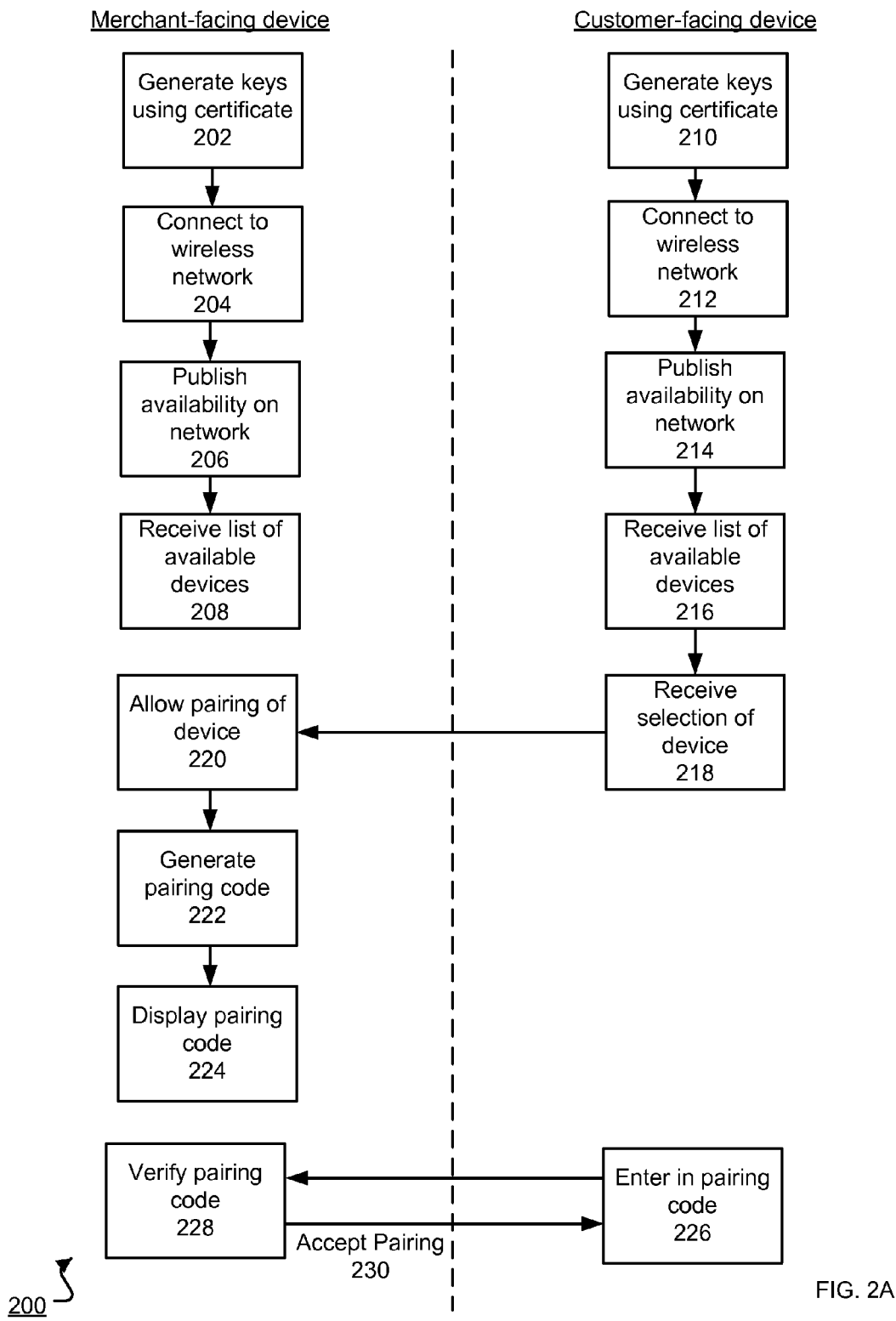
FIG. 2A is a flow chart of an example pairing process.

FIG. 2A is a diagram of an example flow chart of a pairing process 200. The pairing process is one step, e.g., an initial step, of a process conducted between a second device 106 and a first device 102 to establish secure communications. Both the second device 106 and the first device 102 are connected to the wireless network 104. This pairing process 200 can be applied to multiple devices connected to a wireless network, e.g., multiple customer-facing devices, multiple merchant-facing devices, and multiple third-party devices. The pairing process 200 also can be limited to only two devices connected to a wireless network, e.g., one customer-facing device and one merchant-facing device. Both devices run applications that enable the devices to undergo the pairing process 200.

Pairing two devices with the pairing process 200 indicates a user's intent to have the devices communicate with each other. Each device first generates encryption and decryption keys using a certificate, e.g., a Transport Layer Security (TLS) certificate (step 202, 210). In some implementations, the keys include a public key and a private key. The public key can be a public encryption key while the private key can be a private decryption key. Generally, the public key is widely distributed while the private key is known only to one entity (e.g., the device that generated the private key). Messages can be encrypted using the public key and can only be decrypted using the private key.

Both the first device 102 and the second device 104 can connect to the wireless network (steps 212, 204). Once each device connects to the wireless network, each device can publish its availability (e.g., whether it is available to communicate) on the wireless network 104 (steps 206, 214). In some implementations, the devices publish their availability through zero configuration networking (ZeroConf) or universal plug and play (UPnP).

In some implementations, each device publishes a description of its set of capabilities along with the device's availability. In some implementations, the devices exchange descriptions of their set of capabilities after the pairing process. For example, in a payment transaction setting, a set of capabilities can include a device's ability to accept signatures. Another set of capabilities can include a device's ability to accept a swiping of a card. Yet another set of capabilities can include a device's ability to both accept signatures and accept a swiping of a card. Another set of capabilities can include a device's ability to submit a transaction for authorization. One device can refuse to accept data or perform actions requested by the other device that do not correspond to the capabilities associated with the other device, which is further described below in FIG. 4.

Each device can receive a list of available devices (steps 208, 216). The list of available devices can include devices that are capable of completing the pairing process. In some implementations, the list of available devices includes devices running a specific version of an application or a specific operating system version. In some implementations, the list of available devices includes a public key associated with each device. In some implementations, after receiving the list of available devices, each device stores the list into a database of known devices. For example, a merchant device can then retrieve a customer-facing device's public key from the database of known devices when the merchant device wishes to securely communicate with the customer-facing device. A first device receives a selection of one of the devices from the received list of available devices (step 218). For example, the first device 102 receives a selection of a second device 106 from the list of available devices. The first device sends a request to the selected device to pair the devices. In some implementations, the device receives input selecting multiple devices to pair together.

Upon receiving the request to pair the devices, the second device can display a prompt to a user. The prompt can ask whether the devices should be paired together. Once the second device receives input allowing the pairing to the first device (step 220), the second device can generate a pairing code (step 222). The second device then can display the pairing code (step 224). A user then can enter in the pairing code displayed on the second device into the first device (step 226). The entered pairing code is transmitted from the first device to the second device for verification. The second device can then verify that the transmitted code matches the pairing code that was displayed on the second device (step 228). Once the transmitted pairing code is confirmed to match the pairing code displayed in the second device, the second device sends a message to the first device that the pairing is accepted (step 230). The two devices are now paired and can now establish secure communication with each other. In particular, once paired, the devices exchange public keys, and the keys can be used to encrypt communications between the devices.

The first device can be the customer facing device and the second device can be the merchant facing device, but the roles of the customer facing device and merchant facing device could be reversed, e.g., if the merchant facing device first receives the selection of the customer facing device.

Figure 2B:
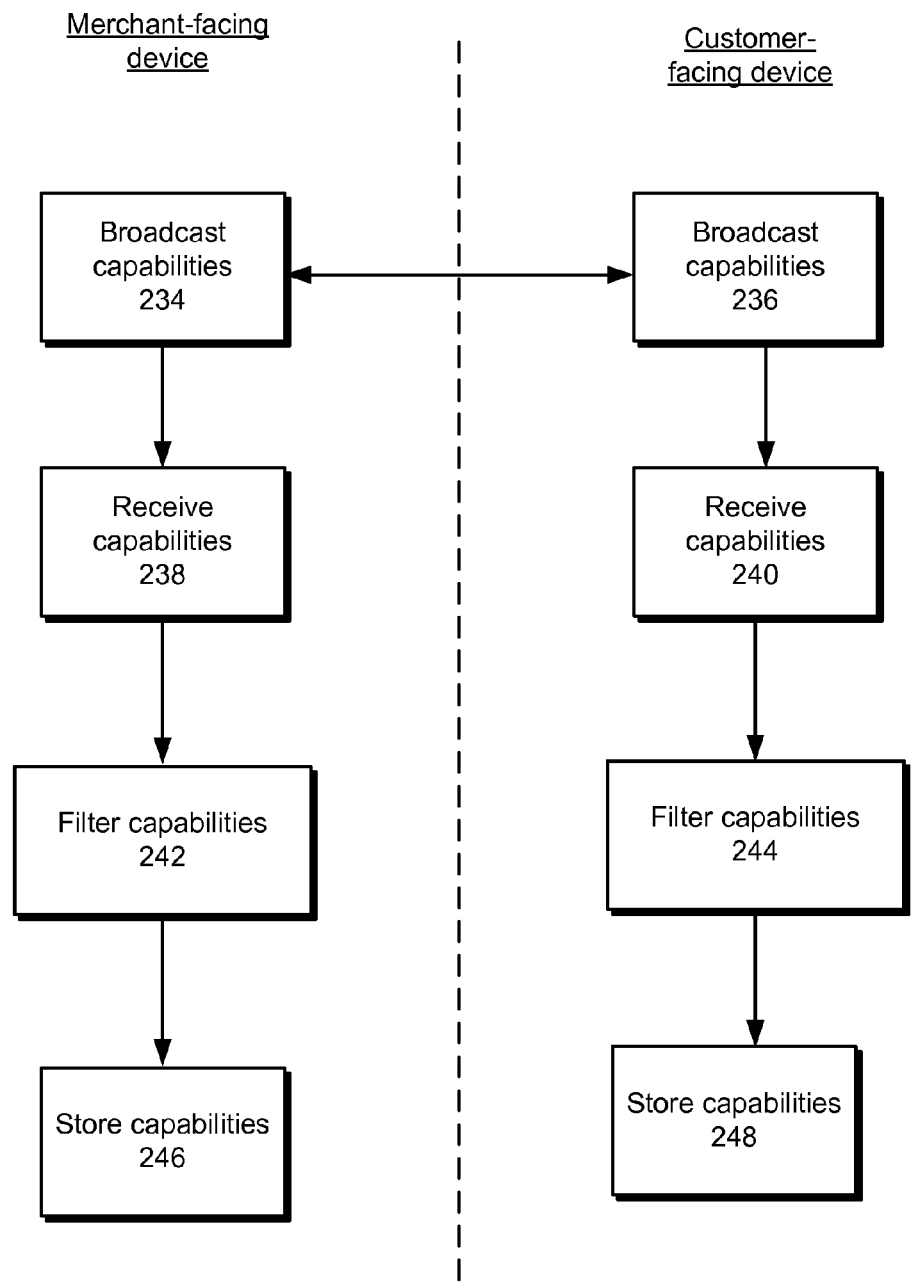
FIG. 2B is a flow chart of an example process for establishing secure communications.

FIG. 2B is a flow chart of an example process for establishing secure communications when the devices have previously exchanged keys (e.g., using the method of FIG. 2A). The configuration process can occur after devices are paired with each other. In some implementations, devices can broadcast their respective capabilities (e.g., as described above in FIG. 2A) to each other or any other device connected to the network after the pairing process (steps 234, 236). In some implementations, the capabilities also include versions of the applications running on the devices, versions of the operating system, or features, e.g., software or hardware capabilities, of each device. The devices can broadcast their capabilities by communicating with each other through a wireless network. The devices then can receive a list of capabilities associated with one or more other devices (steps 238, 240). In some implementations, a device filters the list of capabilities received to include devices having a complementary list of capabilities (steps 242, 244). For example, a device that only has a capability of reading card swipes can limit the list of capabilities received to only include devices having a capability of processing card data.

Capabilities can be complementary such that the combination of the capabilities can cause an action. In general, one device provides some function or data that the other device requires to perform the action. The function can be performed or the data provided by the other device at the request of the one device. For example, a card reader can be complementary to a card processor, e.g., the card processor needs the card data in order to perform the transaction.

In some implementations, the process described in FIG. 2A occurs once during an initial setup of the devices. After the initial setup, subsequent secure communication can occur as long as a session between the devices exists. The session can exist as long as all devices are connected to a wireless network. In some implementations, the session exists as long as all devices are running a merchant or customer application. In other words, if a device disconnects from the wireless network or a device quits the application, the session ends and the devices can no longer securely communicate until another session is started.

In some implementations, before or after the process described in FIG. 2B, a new session is started through a handshake. For example, device A can generate a random number. Device A can retrieve Device B's public key from Device A's database of known devices and encrypt the random number using Device B's public key (previously received in the pairing process shown in FIG. 2A). If Device B is trusted, Device B can decrypt the random number using its private key, increment the random number, retrieve Device A's public key from Device B's database of known devices, and re-encrypt the random number using Device A's public key (also previously received in the pairing process shown in FIG. 2A). After Device B sends the data to Device A, Device A can decrypt the random number using its private key and ensure the random number was correctly incremented. At this point, Device A can trust Device B, a session is started between the two devices, and secure communication can commence using the keys to encrypt communications between the devices.

In some implementations, a session can be started by exchanging public keys. Each device can determine whether the other device is considered a trusted device, i.e., if the received public key matches a public key previously received from the pairing process. If the keys match then the devices are trusted, and secure communication can commence using the keys to encrypt communications between the devices. FIGS. 3A and 3B are views 300 of example graphical user interfaces for two mobile devices. For example, in reference to FIG. 2 (steps 214 and 216), a display 302 of the second device can display a pairing code while a touch-screen display 304 of the first device can receive user input of the pairing code. A user can read the pairing code from the display 302 of the second device and enter the pairing code into the display 304 of the first device. If the entered pairing code matches the transmitted pairing code, the devices can complete the pairing process. Pairing devices can indicate a user's intent for the devices to communicate with each other, but it does not, by itself, necessarily establish secure communication between the devices. The second device can be a merchant-facing device, and the first device can be a customer-facing device.

Figure 4:
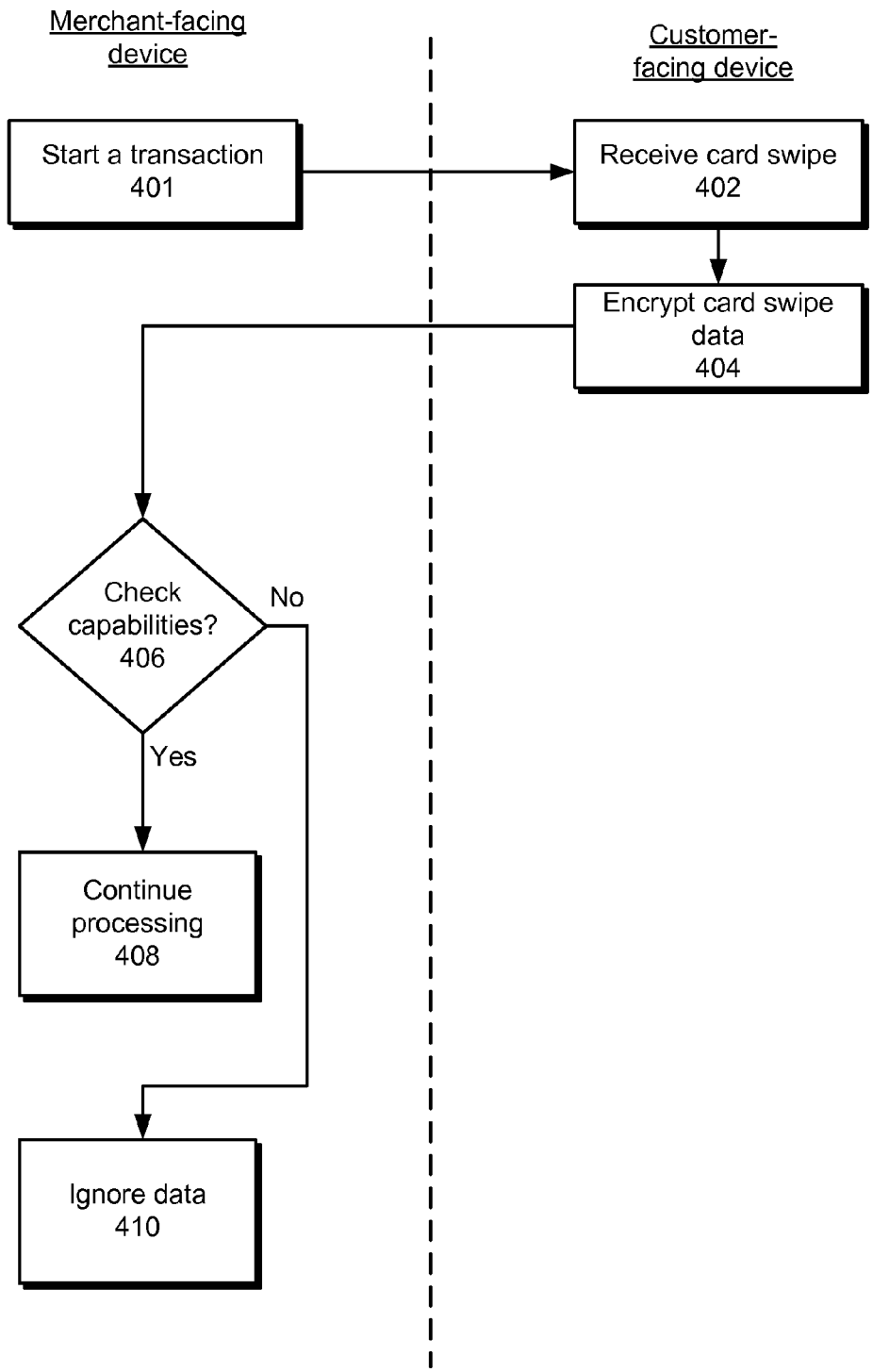
FIG. 4 is a flow chart of an example process for establishing secure communication by checking capabilities between devices.

FIG. 4 is a flow chart of an example process 400 for establishing secure communication by checking capabilities between devices. The process 400 can for example be performed after devices complete a pairing process, e.g. pairing process 200 as shown in FIG. 2. The process 400 can be applied to a payment transaction. In a payment transaction after a merchant initializes a transaction, a customer can swipe a card on a customer-facing device while a merchant-facing device can process the card for a transaction amount. A merchant-facing device can start a transaction (step 401). For example, the merchant-facing device can start a transaction when a merchant finalizes a transaction amount to be charged to the customer. The merchant-facing device can send a request for receiving a card swipe to a customer-facing device. The customer-facing device can receive the request and wait for a card swipe. Once the customer-facing device receives a card swipe from a customer (step 402), the customer-facing device can retrieve the merchant-facing device's public key from the database of known devices and encrypt data from a card swipe using the public key (step 404). The customer-facing device can then send the encrypted data to the merchant-facing device.

Upon receiving the encrypted data, the merchant-facing device can check the capabilities of the customer-facing device (step 406). The merchant-facing device can retrieve the set of capabilities of the customer-facing device from the database of known devices. If the set of capabilities includes the ability to receive card swipes, the merchant-facing device can decrypt the encrypted data using its private key and continue processing the transaction because the merchant-facing device trusts the customer-facing device to receive card swipes (step 408). However, if the set of capabilities does not include the ability to receive card swipes, the merchant-facing device can ignore the encrypted card swipe data because the merchant-facing device does not trust the customer-facing device to receive card swipes (e.g., the customer-facing device can be spoofed to appear legitimate) (step 410). In some implementations, the customer-facing device can check the capabilities of the merchant-facing device (e.g., from the database of known devices) before communicating with the merchant-facing device. For example, as applied in FIG. 4, if the merchant-facing device did not have the capability of processing card swipes, the customer-facing device can choose not to send the encrypted card swipe data to the merchant-facing device.

Establishing secure communication through the pairing process in conjunction with a comparison of public keys can require each device to hold a certificate. However, establishing secure communication through a trusted server can require only the trusted server, and not the devices, to hold a certificate. Furthermore, in some implementations, if establishing secure communication through a trusted server, the devices need not undergo a pairing process, e.g. pairing process 200.

Figure 5:
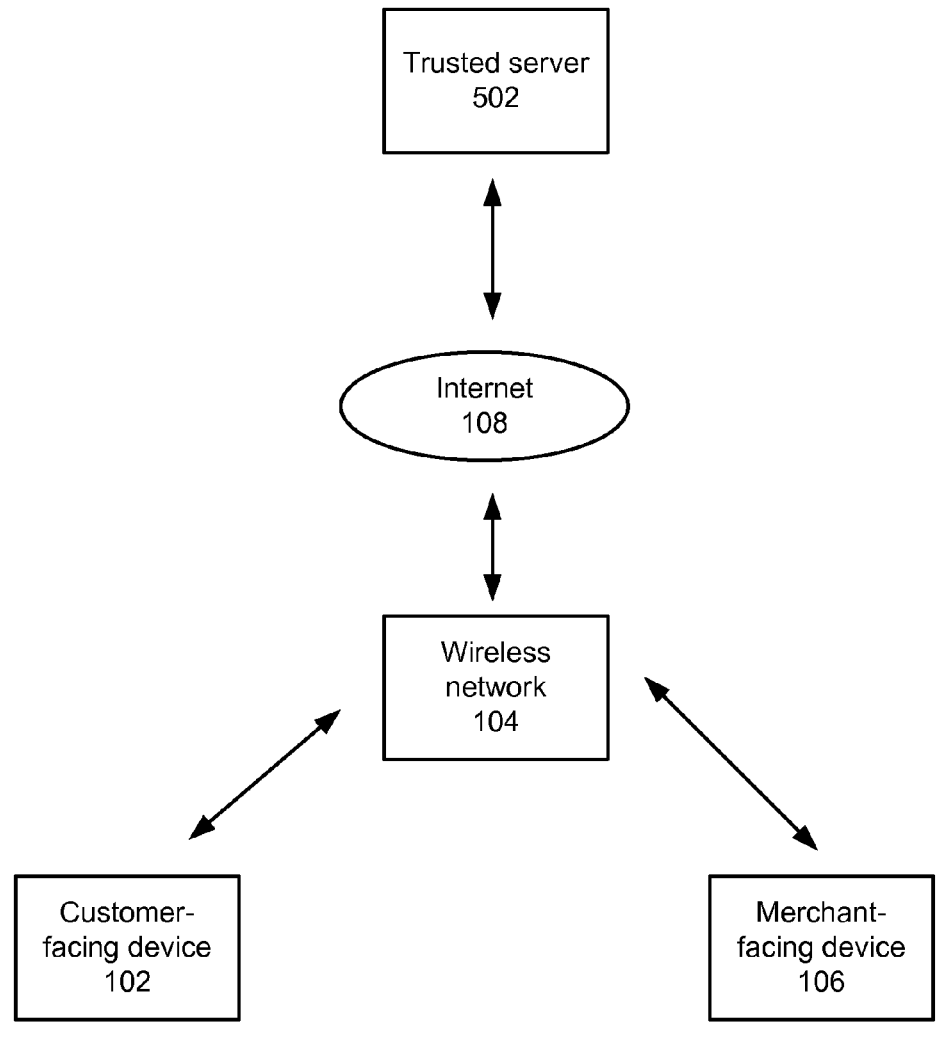
FIG. 5 is a schematic illustration of an example system for establishing secure communication between mobile devices over a wireless network using a trusted server.

FIG. 5 is a schematic illustration of example system 500 configured to establish secure communication between mobile devices over a wireless network using a trusted server. System 500 is similar to system 100, but the mobile devices 102, 104 are configured to communicate with a trusted server 502. For simplicity, this system 500 is shown as including just the first mobile device 102 and the second mobile device 106 communicating over the wireless network 104, but the system 500 can include additional mobile devices. Establishing secure communications between devices through a trusted server can be implemented with more than two devices. For the purpose of some implementations described below, the first device 102 serves as the customer-facing device and the second device 106 serves as the merchant-facing device.

The system 500, and the wireless network 104 in particular, are connected to an external network, e.g., the Internet 108. For example, the wireless network 104 can be a WiFi hot spot that includes a wireless access point for wireless connection to the mobile devices 102, 106, and includes a wired or cellular, e.g., 3G or 4G, connection the Internet 108.

The mobile devices 102, 104 are configured to communicate with the trusted server 502 through the Internet 108. In some implementations, the trusted server 510 is a data processing apparatus having a digitally signed certificate. For example, the digitally signed certificate can be a Transport Layer Security (TLS) certificate.

Figure 6:
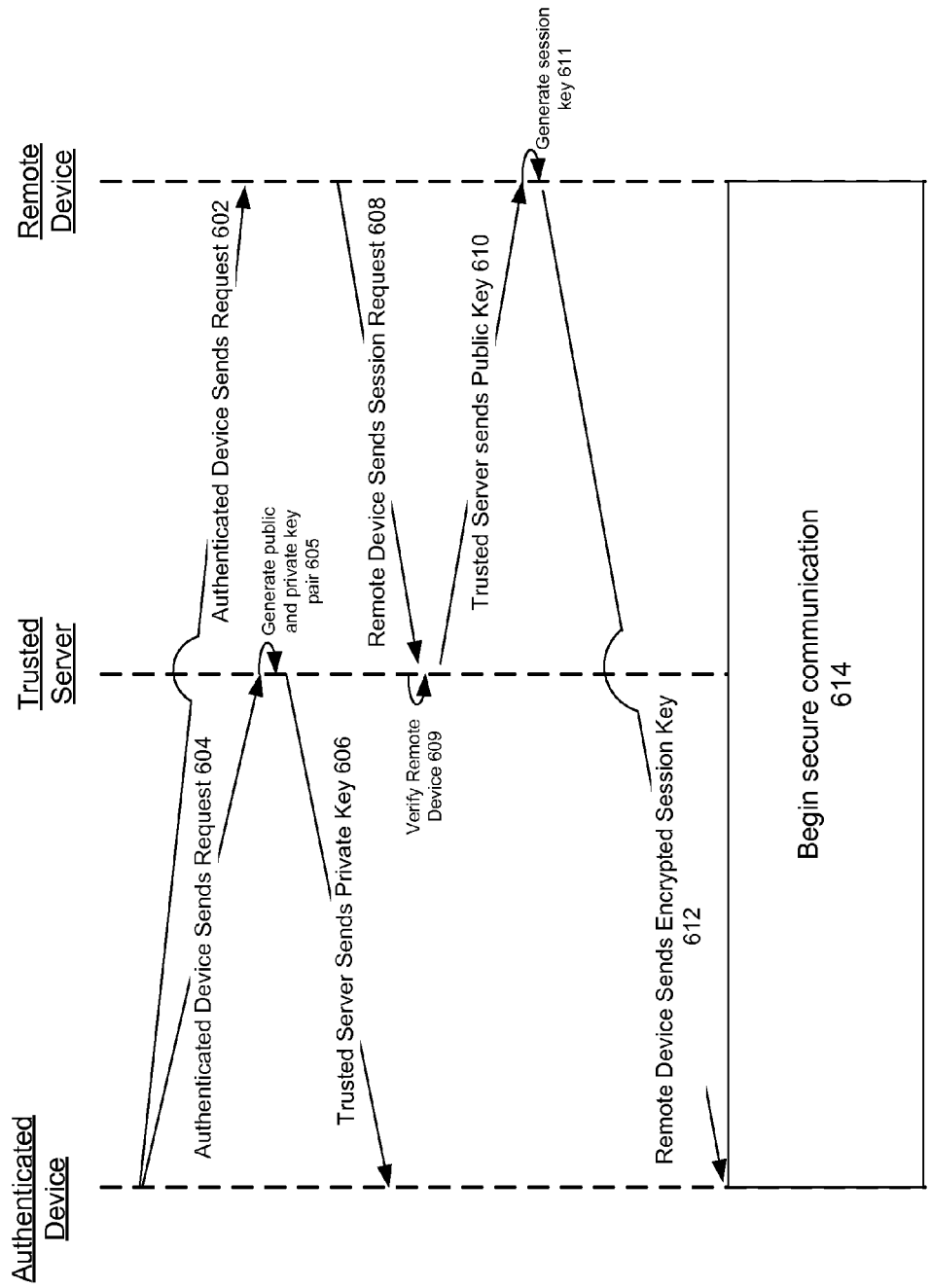
FIG. 6 is a flow diagram of an example process for establishing secure communication between devices using a trusted server.

FIG. 6 is a flow diagram of an example process 600 for establishing secure communication between devices using a trusted server. For simplicity, this process 600 is shown as including just a first mobile device, a second mobile device, and a trusted server as demonstrated in FIG. 5, but the process 600 can include additional mobile devices. The first device can be an authenticated device. A device can be authenticated by signing into the trusted server with a user name and a password. In some implementations, the authenticated device is a merchant-facing device. The second device can be an untrusted remote mobile device requesting to be paired with the authenticated mobile device. In some implementations, the remote device is a customer-facing device or a customer's personal device. Both the first and second devices can inspect the trusted server's certificate and can verify the identity of the trusted server using a trusted scheme, e.g., TLS.

Once the trusted server has been verified, the authenticated device can search for remote devices. In some implementations, the authenticated device searches for remote devices connected to the wireless network 104. In some implementations, the authenticated device searches for remote devices through the trusted server 502. The authenticated device can be searching in the background until the authenticated device finds a remote device. Alternatively, the authenticated device also can enter in a searching mode, during which the authenticated device searches for remote devices in the foreground.

When an authenticated device locates a remote device, the authenticated device can send a request to start a session for secure communication. In some implementations, the request includes metadata indicating a location, a timestamp, and a random number. In some implementations, the request includes metadata indicating a unique identification of the authenticated device. The authenticated device can send the same request to both the trusted server (e.g., over the Internet 108) (step 604) and the remote device (e.g., over the wireless network 104) (step 602).

When the trusted server receives the request, the trusted server can generate a public and private key pair (step 605) and send the private key to the authenticated device (step 606). In some implementations, the trusted server generates the keys using its TLS certificate. The trusted server then can start a unique session with the authenticated device using the request information (e.g., location, time, and the random number).

When the remote device receives the request from the authenticated device, the remote device sends a session request to the trusted server that requests to have the remote device join the session between the trusted server and the authenticated device (step 608). The session request includes the request information received from the authenticated device (e.g., location, time, and the random number) so the trusted server can trust the remote device. In some implementations, once the trusted server receives the session request, the trusted server can verify the remote device is trusted by matching the location, time, and the random number received by the authenticated device (step 609). In some implementations, if the session request includes a unique identification of the authenticated device, the trusted server also matches the unique identification to a list of authenticated devices in a database. After verifying the remote device, the trusted server can join the remote device to the session and send the previously generated public key to the remote device (step 610).

After receiving the public key, the remote device can generate a unique session key (e.g., a secret key) (step 611). The remote device can encrypt the session key using the public key and send the encrypted key to the authenticated device (step 612). When the authenticated device receives the encrypted key, the authenticated device can decrypt the encrypted key using the private key received from the trusted server. Both the authenticated device and the remote device now have the same session key. From this point, the devices can securely communicate with each other by encrypting and decrypting data using the session key (step 614). Furthermore, the devices do not need to communicate with the trusted server any longer and can communicate through a wireless network 104. Because no private key was ever hard-coded on either mobile device, this process mitigates the risk of the private key being compromised. Furthermore, because every key (e.g., public, private, or session key) is unique for every session, this process minimizes risk exposure. In some implementations, the session key, public, and private key expire once the session ends (e.g., a device disconnects from the trusted server) or after a predetermined amount of time.

In some situations, e.g. mobile card processing, it may be advantageous to have different functions or steps of a card transaction be divided between different mobile devices. A system for processing distributed payment transactions allows a customer, also called a user or payer, to securely pay a merchant using a distributed payment. A distributed payment is one where a customer conducts the transaction with a merchant at a point of sale by swiping a card at a mobile customer-facing device that is wirelessly connected with the system. A "customer-facing" device is a device that is configured with applications to display messages to and receive input from the customer. The card can be a credit card, debit card, or pre-paid card.

The system includes a mobile merchant-facing device which communicates with the customer-facing device. The customer-facing device and the merchant-facing device can also connect to a payment service system which processes the transaction using the data from the card swiped by the customer. The system can send confirmation of the transaction to the merchant and/or the customer. The system can also send other data about the transaction to other computer systems, e.g., if the transaction is payment for a taxi ride, the data can include the distance travelled in a taxi.

Figure 7:
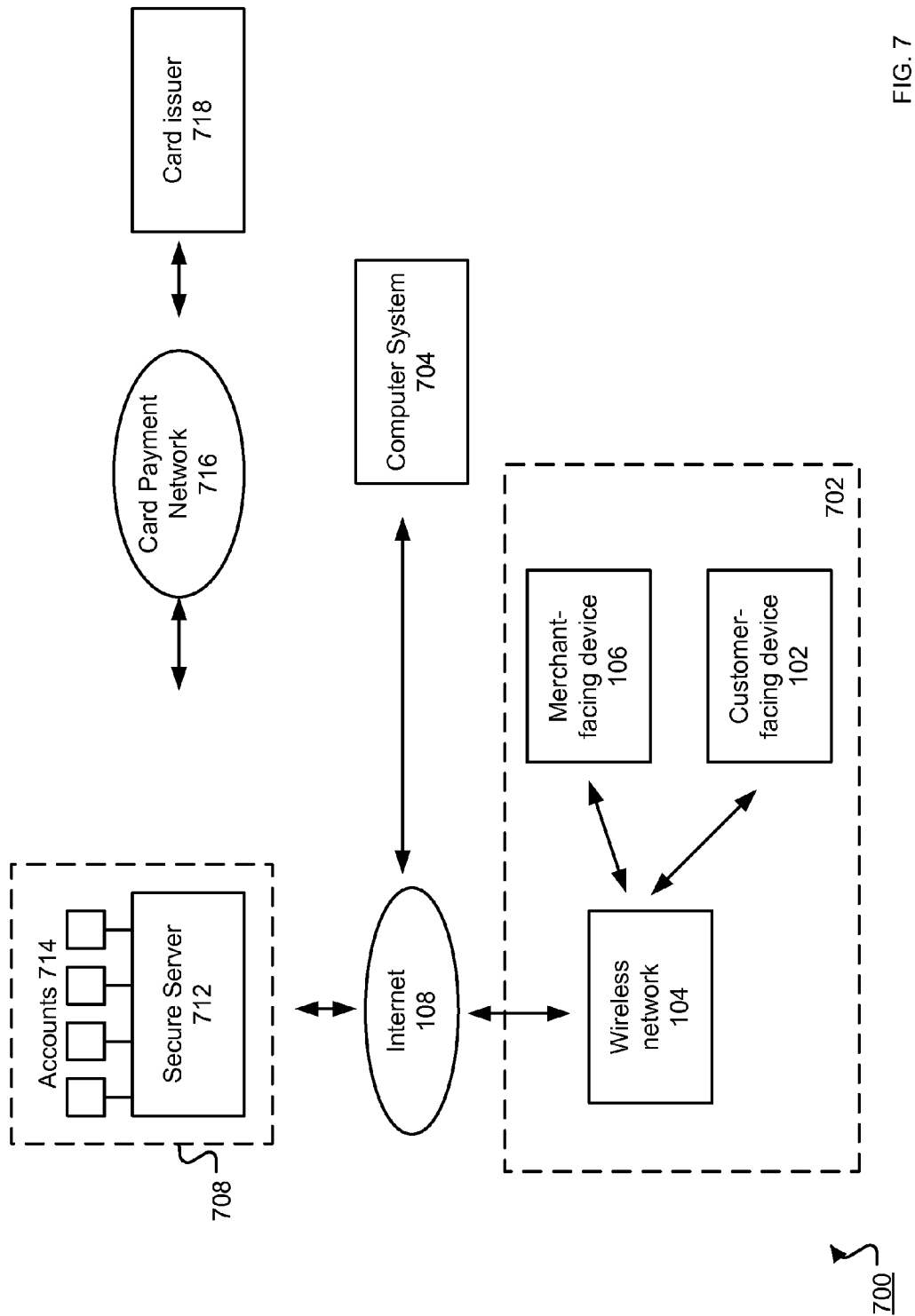
FIG. 7 is a schematic illustration of an example system for processing distributed payment transactions.

FIG. 7 is a schematic illustration of the architecture 700 of an example system for processing distributed payment transactions. The system 700 includes a wireless payment system 702. The wireless payment system 702 includes multiple devices, e.g., a customer facing device 122 and a merchant facing device 126, connected to the wireless network 104. The wireless network 104 is connected at least intermittently to an external network 108, e.g., the Internet. The wireless network 104 can be a wireless access point. In some implementations, the wireless network 104 is a Wireless Fidelity hot spot (Wi Fi hotspot).

The system 100 or the system 500 can be used in implementing the wireless payment system 702. The customer facing device 122 can be implemented using the first device 102, but with additional programming to enable the device for use in the distributed payment transaction. Similarly, the merchant facing device 126 can be implemented using the second device 106, but with additional programming to enable the device for use in the distributed payment transaction. The wireless network 104 can be implemented using the wireless network 104.

In some implementations, devices connected to the wireless network 104 can securely communicate with each other, e.g., through a process of establishing secure communication as described above. In particular, once secure communication is established, the devices connected to the wireless network 104 can securely communicate with each other without data passing through the external network 108, e.g., through the Internet.

The customer facing device 122 can be a mobile computing device, i.e., a hand held computing device, capable of running a customer application. For example, the customer facing device 122 can be a smart phone, tablet computer, laptop, or other data processing apparatus. The customer facing device 122 can include a display, e.g., a touch screen display. In some implementations, the customer facing device 122 and the display are two devices connected to each other.

The customer facing device 122 can include or be attached a credit card reader 720. For example, the card reader can be attached to an input, e.g., an audio jack, of the customer facing device 122.

The merchant facing device 126 is also a mobile computing device, capable of running a merchant application. For example, the merchant facing device 126 can be a smart phone, tablet computer, laptop, or other data processing apparatus. The merchant facing device 126 can also include a display, e.g., a touch screen display. In some implementations, the wireless payment system 702 includes more than one customer facing device or more than one merchant facing device.

In some implementations, the merchant application has a login and logout functionality such that multiple merchants, each having a separate account with the payment processing system 708, can use the same device 126 for processing distributed payment transactions. Association by the payment processing system 708 of the device 126 with the appropriate merchant account can be done by conventional login techniques.

In some implementations, the system 700 includes a computer system 704 connected to the network 108. The computer system 704 can process or store data related to the transaction for analysis by the merchant or another third party that has a right to the data related to the transaction. For example, the merchant can be a franchisee and the third party can be the franchisor. As another example, third party can be responsible for coordinating jobs between various merchants who are themselves independent contractors, e.g., the merchant can be a taxi driver and the third party can be a dispatcher.

When a merchant submits a transaction to the payment service system 708, the transaction can include sufficient information, e.g., the name or id number of the merchant, to associate the merchant with the third party. The payment service system 708 can maintain a database associating merchants with third parties, and when the payment service system 708 receive this information, it can identify the associated third party from the information. This allows the payment service system 708 to send data about transactions to the computer system 704 of the associated third party.

For example, if the system 700 is implemented in a restaurant, a customer can pay a restaurant using the wireless payment system 702 after a waiter at the restaurant brings the customer the final tab of the meal. After conducting the transaction, the system can send data about the meal to a computer system 704, e.g., a meal tracking system. The data can include which items were ordered, the cost of the meal, the tip included, the date and time of the meal, or which waiter served the customer.

In some implementations, the customer facing device 122 receives transaction details from the merchant facing device 126 and displays the details on the display of the merchant facing device 126. In particular, the merchant facing device 106 can calculate an amount for the transaction, e.g., based on purchase of individual items, and the amount can be sent to the customer facing device 122 and displayed.

The wireless payment system 702 can communicate with a payment service system 708 using the network 108.

In some implementations, the merchant facing device 126 receives transaction details from the customer facing device 122 and communicates with the payment service system 708 to submit a request for authorization of the transaction. In particular, when the customer swipes the card through the card reader 720, the card information can be sent to the merchant facing device 126. Similarly, a signature, PIN, or other data required for authorization of the transaction can be input by the customer into the customer facing device 122, e.g., entered on the touch screen display, and this data can be sent to the merchant facing device 126.

In some implementations, the customer facing device 122 does not send transaction details to the merchant facing device 126. Instead, the customer facing device 122 receives the amount for the transaction from the merchant facing device 126, and receives the card information from the card reader 720 when the customer swipes the card. The customer facing device 122 communicates with the payment service system 708 to submit a request for authorization of the transaction.

The payment service system 708 includes a secure server 712 to processes all transactions from the wireless payment system 702. The secure server 712 handles secure information such as credit card numbers, debit card numbers, bank accounts, user accounts, user identifying information or other sensitive information.

The payment service system 708 can communicate electronically with a card payment network 716, e.g., Visa, Mastercard, or the like. The payment service system 708 can communicate with a card payment network 716 over the same network 108 used to communicate with the wireless payment system 702, or over a different network. The computer system 716 of the card payment network can communicate in turn with a computer system 718 of a card issuer, e.g., a bank. There can also be computer systems of other entities, e.g., the card acquirer, between the payment service system 708 and the card issuer.

Before a transaction between the user and the merchant can be performed using the wireless payment system 702, the merchant must create a merchant account with the payment service system 708. The merchant can sign up using a mobile application or using an online website, and can use a device within the wireless payment system 702 or another computing device, e.g., a home computer. At some point prior to the transaction, one or more applications are downloaded to the devices within the wireless payment system 702, e.g., a merchant facing device and a customer facing device. The merchant facing and customer facing devices may run the same application or customized applications to each device (e.g. a merchant application and a customer application). In some implementations, the applications are downloaded through an application store. Creation of the merchant account can be handled through the application, or through another application, e.g., a generic web browser. The merchant enters a name, account password, and contact information, e.g., email address, and physical location information (if applicable), e.g., an address, into the payment service system 708. The merchant can also provide other information, e.g., a list of goods or services available, operating hours, phone number, a small identifying image logo or mark, to the payment service system 708. The data associated with the merchant account 714 can be stored at the secure server 712, e.g., in a database. In some implementations, the merchant can provide information sufficient to establish communication with the computer system 704 and this information can be stored in the payment service system 708.

Eventually, in order to receive funds from the transaction, the merchant will need to enter financial account information into the payment service system 708 sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the payment service system 708 can hold the received funds until the financial account information is provided.

Figure 8:
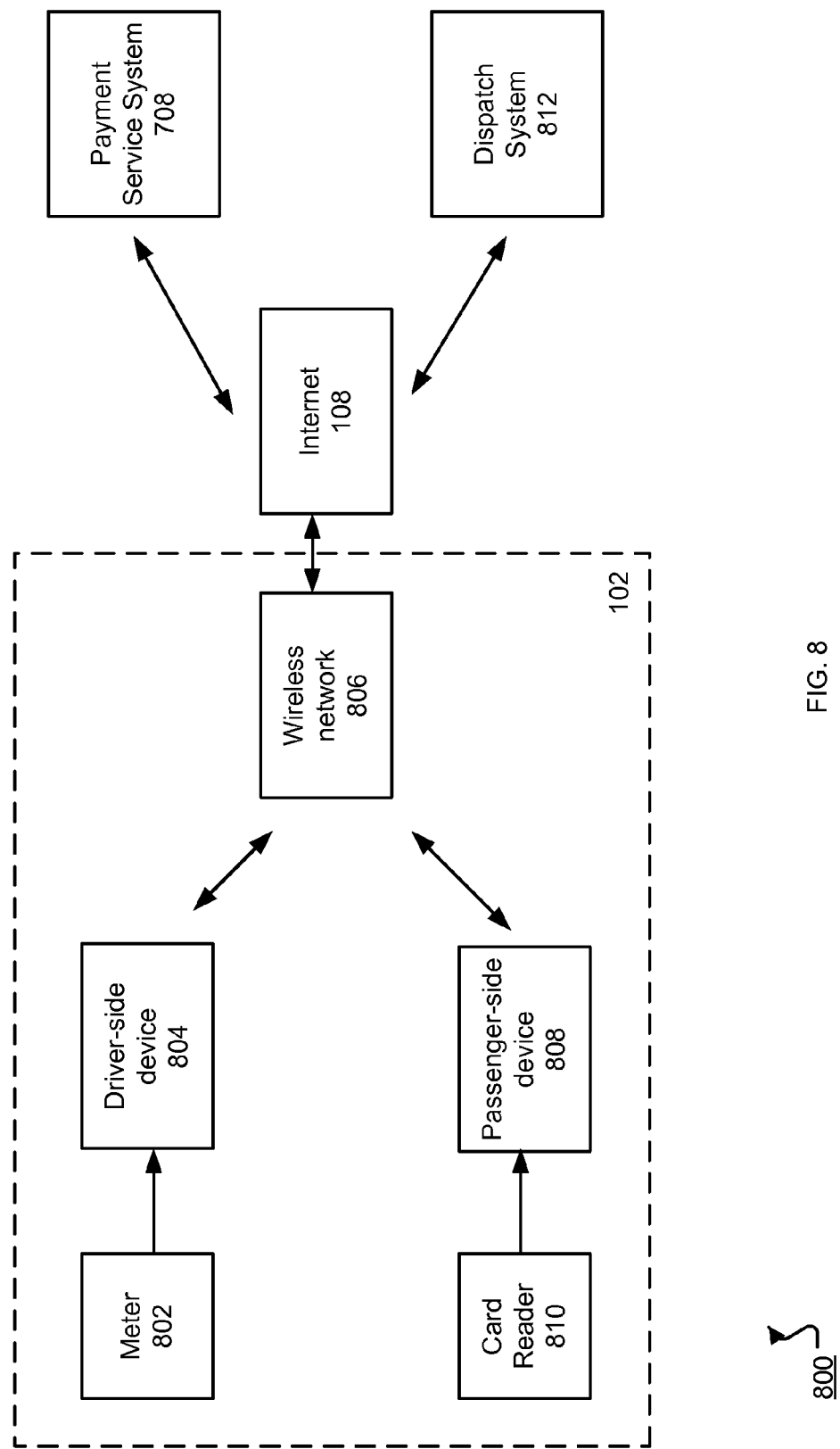
FIG. 8 is a schematic illustration of an example wireless payment system implemented for a taxi.

FIG. 8 is a schematic illustration of a wireless payment system implemented in a taxi environment. The wireless payment system 102 includes a meter 802, a mobile driver side (i.e., merchant facing) device 126, a passenger side (i.e., customer facing) device 122, a card reader 810, and the wireless network 104. The wireless network 104 can include wireless access point mounted in the vehicle that provides a WiFi hot spot. The wireless network 104 can include a transceiver that provides a cellular connection, e.g., 3G or 4G, to the external network 108.

In some implementations, the driver side device 126 is physically connected to the meter 802, e.g., by a data cable, such as a USB cable. The driver side device 126 can be positioned next to the taxi driver in the front of the taxi. The driver side device 126 is wirelessly connected to the wireless network 104. The driver side device 126 can be a smart phone or tablet computer having a display onto which the driver has loaded an appropriate application. The driver side device 126 can also display a passenger fare for the taxi ride.

The passenger side device 122 can be positioned in the back of the taxi where a customer can interface with the device. For example, the passenger side device 122 can be affixed to the back of the taxi with the card reader 810 attached to an input, e.g., an audio jack, of the passenger side device 122. The passenger side device 122 is wirelessly connected to the wireless network 104. The passenger side device 122 can be a tablet computer onto which an appropriate application has been loaded. As a tablet computer, the passenger side device 122 includes a display, e.g., a touch screen display.

In some implementations, the driver application has a login and logout functionality such that multiple taxi drivers, each having a driver account, can use the same device 126 for processing distributed payment transactions. Association by the payment processing system 708 of the device 126 with the appropriate driver account can be done by conventional login techniques.

The driver side device 126 can read data from the meter 802, e.g. fare of a trip, while the passenger side device 122 can read card data, i.e., card information such as the card number, or cardholder name, from the card reader 810. The wireless payment system 102 can communicate with the payment service system 708 over the external network 108, e.g., the Internet.

The wireless payment system 102 can also communicate with a computer system 812, e.g., a dispatch system, of a dispatcher. The computer system 812 can process or store data about taxi rides, as discussed below.

In the taxi environment, when a driver submits a transaction to the payment service system 708, the transaction can include sufficient information, e.g., the name or id number of the driver, to associate the driver with the dispatcher. The payment service system 708 can maintain a database associating drivers with dispatchers, and when the payment service system 708 receive this information, it can identify the associated dispatcher from the information. This allows the payment service system 708 to send data about the taxi ride to the computer system 812 of the associated dispatcher.

For example, if the system 700 is implemented in a taxi, a customer can pay a taxi driver using the wireless payment system 702 after the taxi driver brings the customer to the customer's destination. After conducting the transaction, the system can send data about the taxi ride to a computer system 704, e.g., the computer system of the dispatcher. The data can include a start location and an end location of the taxi ride, the duration of the trip, the distance of the trip, the date and time of the trip, total cost of the trip (e.g., passenger fare and tip), or which taxi cab performed the service.

Figure 9:
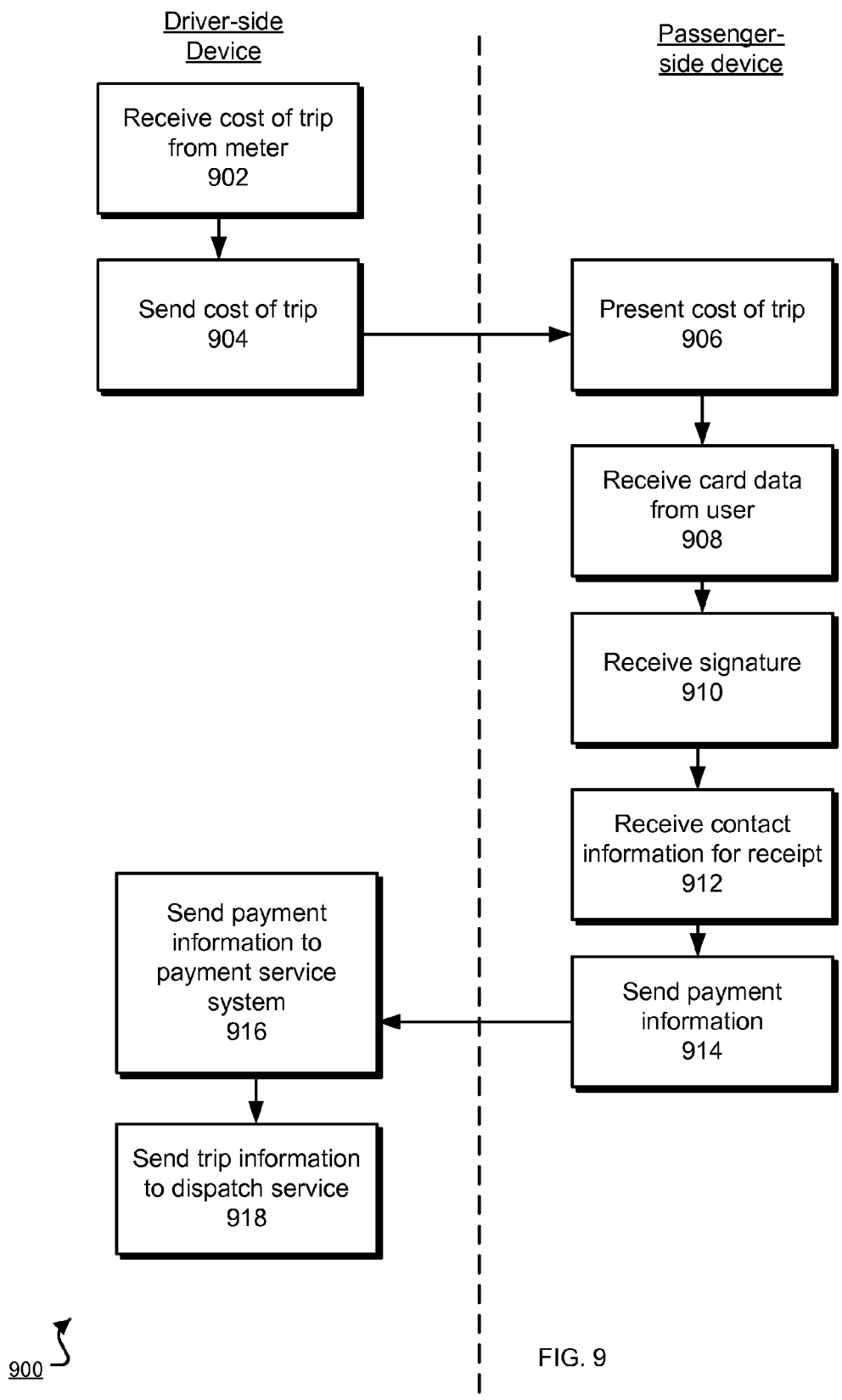
FIG. 9 is a flow chart of an example process conducted with the wireless payment system.

FIG. 9 is a diagram of an example flow chart of a process 900 conducted with the wireless payment system 102 implemented in a taxi environment. For example, a customer can enter a taxi and ask a taxi driver to take the customer to a destination. The taxi driver starts a meter that determines the fare of the trip based at least on the distance and duration of the trip. In some implementations, when the driver starts the meter, the meter generates a signal that is sent to the driver side device indicating that the ride has started.

Once the taxi driver arrives at the destination, the taxi driver stops the meter, which causes the meter to finalize the fare of the trip. The driver side device then receives the fare of the trip from the meter (step 902). The driver side device can send the fare of the trip to the passenger side device (step 904). In some implementations, the driver side device sends the fare to the passenger side device after receiving a signal from the meter (e.g., the driver stops the meter) indicating an end of the trip.

Once the passenger side device receives the fare of the trip through the wireless network, the passenger side device can display the fare of the trip (step 906) to the customer. The customer can pay by swiping a card through the card reader attached to the passenger side device. The passenger side device can receive card data, the card number, from the card reader (step 908). In some implementations, the passenger side device can receive card data from a customer that manually inputs in a card number. After receiving card data, the passenger side device can optionally display a request for a signature and receive a signature approving the transaction (step 910). The passenger side device can display a request to enter a tip amount, and can receive passenger input selecting a tip amount. The passenger side device can calculate a total transaction amount (the fare plus the tip) and display the total transaction amount. The passenger side device can also receive contact information for a receipt (step 912). The passenger side device can receive this information through customer input into the passenger side device, e.g., through a graphical user interface on the touch screen display.

In some implementations, the passenger side device initiates the request for authorization of the transaction. In this case, the passenger side device sends the payment information, which includes at least the transaction amount and the card data (e.g., the card number), but may also include the signature and contact information, directly to the payment service system.

In some implementations, the driver side device initiates the request for authorization of the transaction. In this case, the passenger side device sends the payment information, including at least the card data received from the card reader, to the driver side device (step 914). The signature, tip amount or total transaction amount, and contact information can also be sent to the driver side device. The driver side device can then send the payment information to the payment service system (step 916/1006).

FIG. 10B is a diagram of an example flow chart of a process 1014 conducted by a payment service system 708 after receiving a distributed payment transaction from the wireless payment system 102. The payment service system 708 can receive the distributed payment transaction from the wireless payment system (step 1006). The distributed payment transaction can include card data, a signature, and other payment information (e.g., payment amount) provided by the customer.

The payment service system 708 then processes the distributed payment transaction (step 1008) by sending a record to the computer system of the card payment network 716, e.g., Visa or MasterCard, and the card payment network 716 then sends the record to the card issuer, e.g., the bank, as described above in FIG. 1.

If the transaction fails because it would exceed the credit limit or there are insufficient funds in the customer's financial account, the payment service system 708 notifies the application on whichever device (driver side or passenger side) that initiated the request for authorization. A notice of the failure of the transaction can be displayed on the passenger side device.

If the transaction succeeds and the payment service system 708 receives approval from the card payment network 716, the payment service system 708 communicates this to whichever device (driver side or passenger side) that initiated the request for authorization. The driver side and/or passenger side device then captures the transaction. In the capture stage, the approved transaction is again routed from the capturing device to the card processor, card network and card issuer. The record of the transaction in the capture stage can include the cardholder's signature (if appropriate), or other information. The capture state can trigger the financial transaction between the card issuer and the merchant. On receipt of an indication from the card network that the transaction has been captured, the payment service system 708 optionally creates receipts to send to the customer, e.g., through the customer application and/or through the previously provided contact email, and to the merchant. For example, if the wireless payment system 702 is implemented in a taxi environment, before signing for the transaction, the customer can input an email address to which the payment service system can send the receipt. Both devices can then display the receipt in each of their applications.

Furthermore, in some implementations, the driver side device or passenger side device sends data about the taxi trip to a dispatch system (step 918 in FIG. 9). The data about the taxi trip can be sent directly to the dispatch system, or the data can be sent to the payment service system which then routes the data about the taxi trip to the dispatch system. The data about the taxi trip can include a start location and an end location of the taxi ride, the distance of the trip, the duration of the trip, the date and time of the trip, fare of the trip, or which taxi cab performed the service.

In some implementations, the driver side device is configured to determine its location using a mobile device tracking function, e.g., GPS or cellular multilateration. The driver side device determines the start location upon receiving a signal indicating the start of a ride (e.g., a signal that the taxi driver started the meter), and determines an end location upon receiving a signal indicating the end of a ride (e.g., a taxi driver stopping the meter). In some implementations, the meter is configured to determine its location using a mobile device tracking function, e.g., GPS or cellular multilateration, and the meter provides the start location and end location to the driver side device. The driver side device sends the start location and the end location to the computer system of the dispatcher, e.g., directly or via the payment service system.

Since the meter measures the distance travelled, meter can provide the distance travelled to the driver side device. The driver side device can measure the duration of the trip and the date and time of the trip based on the start time and the end time of the signals received. The driver side device can store the fare of the trip by reading the data from the meter. The driver side device can also store which taxi cab performed the service based on personal information entered when installing the merchant application or a mobile device identification code that was assigned to the taxi cab when installing the merchant application. Because a mobile device identification code is unique, the mobile device identification code can be associated with a taxi driver and other ride information. In some implementations, the wireless network is assigned a unique wireless access point identification code, and this wireless access point identification code is sent to the dispatch system to be associated with the taxi driver and other data (e.g., start and end locations of the trip, a duration of the trip, fare of the trip, etc.).

In some implementations, the data about the taxi ride is sent by the driver side device upon receiving a signal indicating the end of the ride. In other implementations, the driver side device, the driver side device stores the data and sends the data to the computer system of the dispatch service at a later time (e.g., in a batch at the end of a workday).

FIG. 10A is a diagram of an example flow chart of a process 1000 conducted by a dispatch system after receiving a distributed payment transaction implemented in a taxi environment. The dispatch system can be a computer system that analyzes data. The dispatch system can receive data about the taxi ride (step 1002). The data can be sent by the wireless payment system 102 or the payment service system 708. The dispatch system can then store ride information in a database (step 1004).

Figure 11:
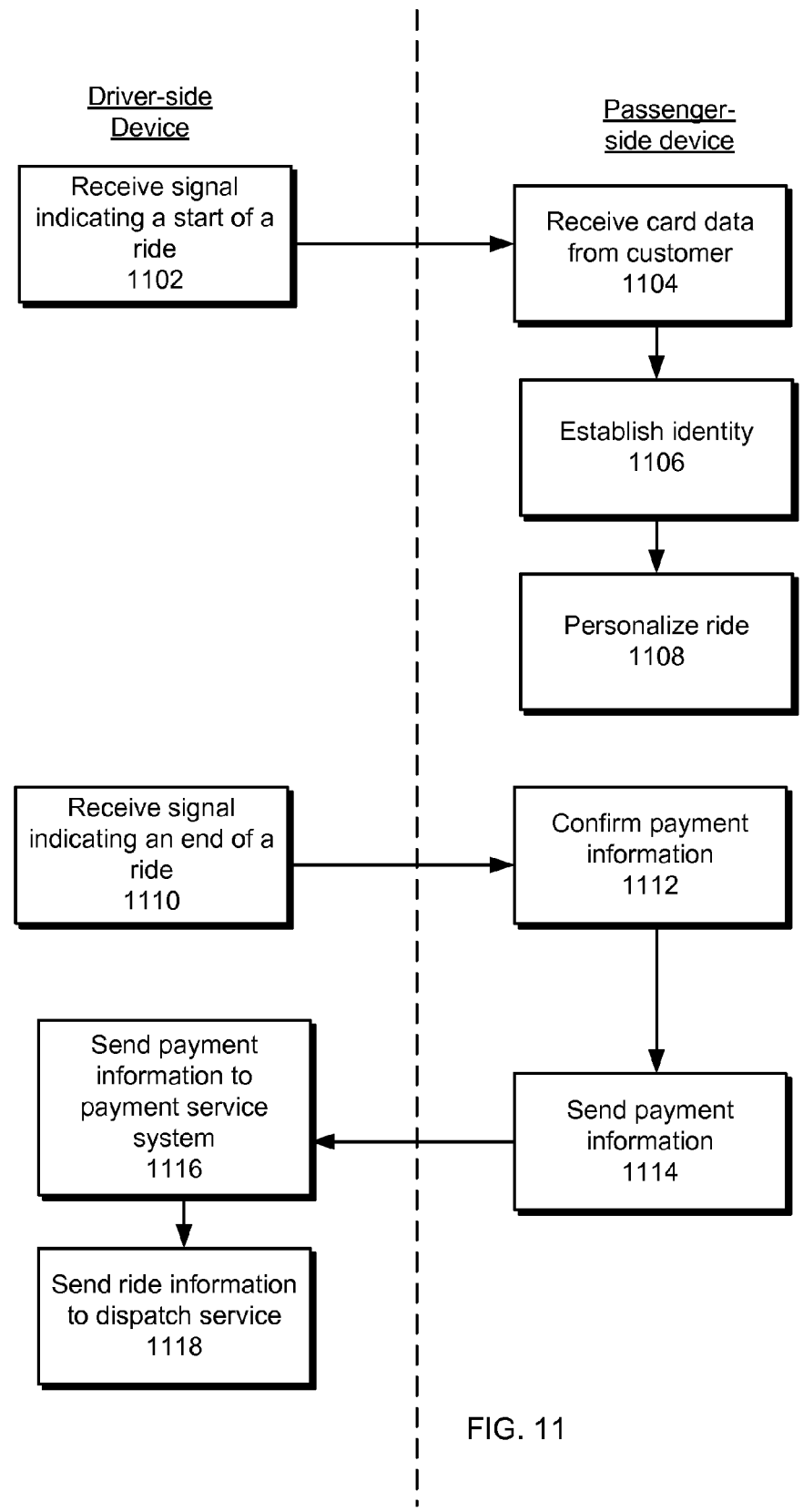
FIG. 11 is a flow chart of an example process 1300 conducted by a "swipe and ride" wireless payment system.

FIG. 11 is a diagram of an example flow chart of a process 1100 conducted by a "swipe and ride" wireless payment system implemented in a taxi. A "swipe and ride" wireless payment system implemented in a taxi allows a customer to swipe a card at the beginning of a ride, e.g., upon a customer's entering a taxi, and to pay using the card at the end of the ride without having to swipe again. During the ride, the "swipe and ride" system can provide a personalized ride by displaying information specific to the customer.

The driver side device (i.e., merchant facing device) can receive a signal from a taxi driver indicating the start of a ride (step 1102) (e.g., the taxi driver starting the meter). This can trigger the passenger side device (i.e., customer facing device) to receive card data from a customer (step 1104). A customer can provide card data by manual input or by swiping a card at a card reader attached to the passenger side device. In some implementations, the card reader retrieves card data including the cardholder's name (e.g., customer's name) from the card. In some implementations, the card reader retrieves card data including the card number from the card. In some implementations, the customer can provide card data before the driver side device receives a start signal from the taxi driver. For example, the passenger side device can have a default display requesting that the user swipe a card through the card reader.

If a customer swipes a card before the end of the ride, the wireless payment system can establish an identity of the customer (step 1106). The wireless payment system can establish an identity of the customer by tokenizing the received card data and sending the tokenized card data to the payment service system 708. In some implementations, tokenizing the card data creates a unique hash of the card data that indicates a unique identity for the card owner. Tokenized card data can contain encrypted card data and therefore can be securely transmitted from the wireless payment system to the payment service system 708. The payment service system 708 receives the tokenized card data and determines whether the tokenized card data exists in an identity database. If the received tokenized card data does not exist in the identity database, the payment service system 708 can create an identity associated with the tokenized card data. In some implementations, if the payment service system 708 receives tokenized card data that already exists in an identity database, the payment service system 708 retrieves data about the identity, processes the data to create a response that includes a personalized experience, and sends the response back to the passenger side device of the wireless payment system.

A wide variety of data can be stored by the payment service system 708. For example, if a passenger indicates consent on the customer side device, then the end location of the trip can be stored by the payment service system 708 and associated with the tokenized card data. Thus, as the passenger takes multiple rides, the payment service system 708 will assemble a history of destinations of the customer.

In some implementations, the response includes a history of recent destinations, e.g., a customer's previous three destinations, or the most frequent destinations travelled to by the customer. The passenger side device can display the previous destinations to the customer. The passenger side device can receive a selection from the previous destinations that is chosen by the customer, e.g., through a tapping gesture on a touch screen display. The passenger side device then can transmit the selection to the driver side device through the wireless network. The driver side device then can receive the destination selected by the customer and display the destination. This can allow the driver to quickly understand where to take the customer.

In some implementations, the response includes an advertisement personalized to the identity of the passenger. For example, if the identity frequently visits a restaurant, the advertisement can be an offer to that restaurant or can be an offer to similar restaurants related to the frequently visited restaurant. The passenger side device can display the advertisement received to the customer.

The passenger side device can receive the response and personalize the ride by displaying the response to the customer (step 1108). In some implementations, if the tokenized card data is not yet associated with an identity in the payment service system 708, the payment service system 708 may not have enough information to generate a personalized ride and the passenger side device displays local events or news to the customer.

The customer can also provide a tip before arriving at a destination. In some implementations, the passenger side device displays an option to display a view for obtaining a tip through a graphical user interface. Upon receiving input to display the tip view, e.g., a tapping gesture on a touch screen display from the customer, the passenger side device displays the view as further described in FIG. 14. Once the customer finalizes the tip amount, the passenger side device can add the tip amount specified by the customer to the fare of the ride once the ride ends.

Once the taxi arrives at the customer's destination, the taxi driver can stop the meter. In some implementations, stopping a meter generates an end signal that indicates the end of a ride. Once the driver side device receives this signal (step 1110), the driver side device communicates with the passenger side device to finalize the distributed payment transaction. The passenger side device can display the payment information received when the customer first swiped a card, e.g., upon entering the taxi, and can confirm the payment information with the customer. In some implementations, the passenger side device also displays a request for permission to store the destination of the trip. If the customer approves the request, the passenger side device can send the destination of the trip to the payment service system, which can associate the destination of the trip with the identity (i.e., tokenized card data) of the customer. On the passenger side device, the customer can confirm the transaction by either signing a digital receipt on the passenger side device or approving the transaction through the passenger side device. In some implementations, the customer does not have to sign a digital receipt if the fare and tip is less than a predetermined threshold, allowing the payment service system 708 can submit the transaction for authorization without a signature. Once the passenger side device receives approval of the transaction from the customer, the passenger side device can send the payment information to the driver side device (step 1112). The driver side device can then send a record of the distributed payment transaction to the payment service system (step 1116). The driver side device can also send ride information to a dispatch service (step 1118). As mentioned above, in some implementations, the passenger side device sends a record of the distributed payment transaction to the payment service system 708. Also, the payment service system 708 or the passenger side device can send ride information to a dispatch service.

The "swipe and ride" system is not limited to a taxi environment. For example, the "swipe and ride" system can be applied to a restaurant environment. Upon entering a restaurant, a customer can swipe a card at a customer facing device. After a swiping of the card, "swipe and ride" system can send the tokenized card data to the payment service system, either through a customer facing device or a merchant facing device. The payment service system can retrieve the identity associated with the tokenized card data and send data including a personalized experience to the customer facing device. For example, the "swipe and ride" system can provide the customer facing device with data that displays the customer's previously ordered items or the customer's most frequently ordered items at the restaurant.

Figure 12A:
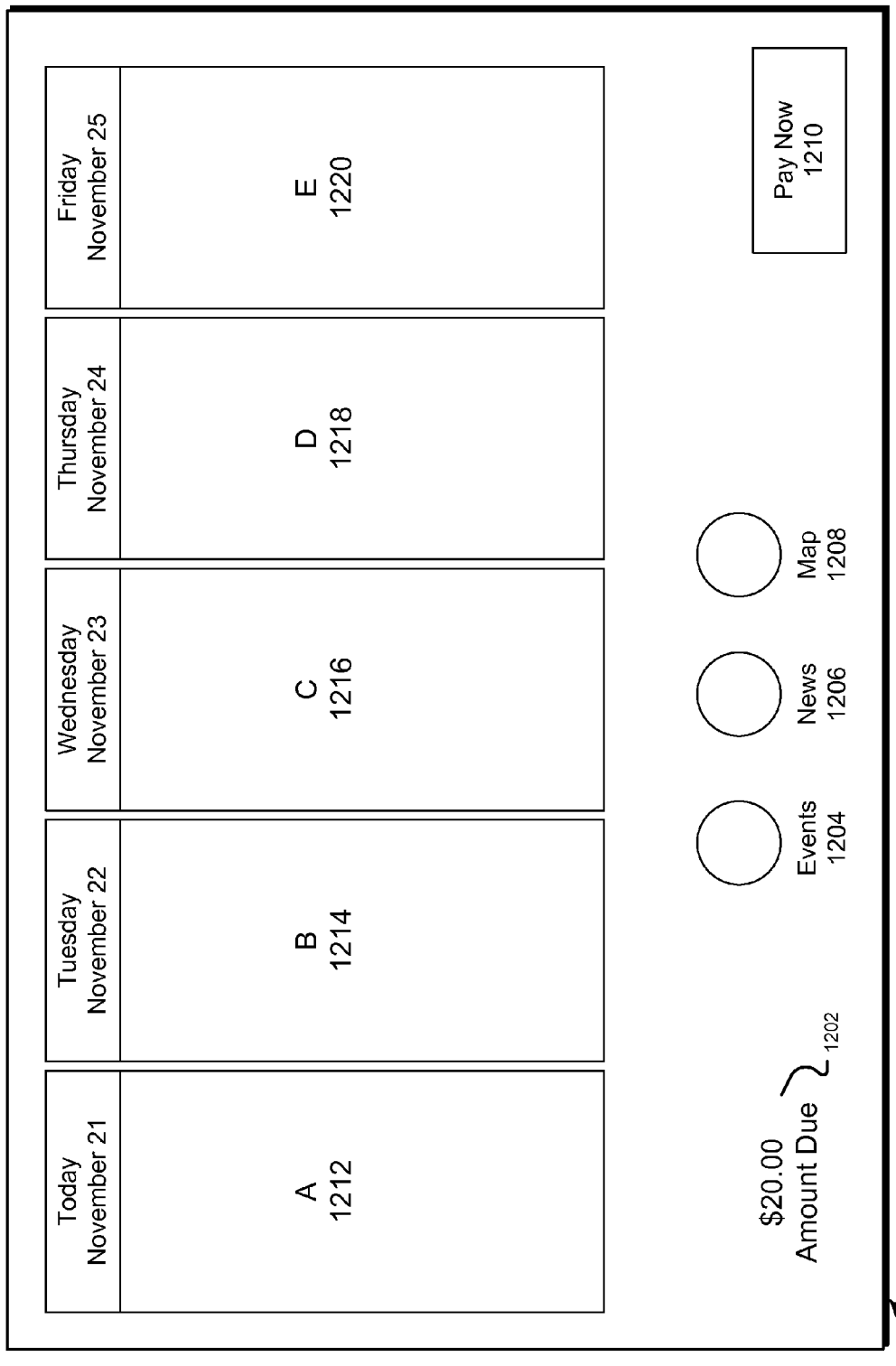

FIG. 12A is a diagram of an example events view 1200 displayed by a customer application on the customer facing device. The customer application can cause the customer facing device to send the current time and location to the payment service system 708 or another system that can determine items of interest. The system that receives the request can process the request and send a list of relevant events to the customer facing device based at least on the current time and location of the customer facing device. For example, if the application is implemented in a taxi environment, the customer facing device can receive a list of relevant results and display the list through the events view 1200 of the customer application while the customer is riding the taxi en route to or arriving at a destination. This events view 1200 can display current events A 1212, B 1214, C 1216, D 1218, or E 1220 that are occurring on different days near the present date and time. By selecting any event, the customer can learn more information about the event. The customer facing device receives a selection of an event and sends a request for more information to the payment service system 708 or another system that has information about the event. The customer facing device can receive a response including more information about the event and can display more information about the event in a new view. The view 1200 can display the amount due 1202 which is set by the merchant. For example, if the application is implemented in a taxi environment, the amount due 1202 can be set when the taxi driver stops the meter from running. Alternatively, the amount due 1202 can be updated periodically when a new value is received from the merchant facing device. The events view 1200 also can provide options for the customer to change views from events 1204 to news 1206 or a map 1208. In some implementations, the customer facing device can display an option to view more information about the merchant or the driver of the taxi. The view also provides an option for the customer to "Pay Now" 1210. Invoking "Pay Now" 1210 can cause the application to display the views described in FIGS. 15 17.

Figure 12B:
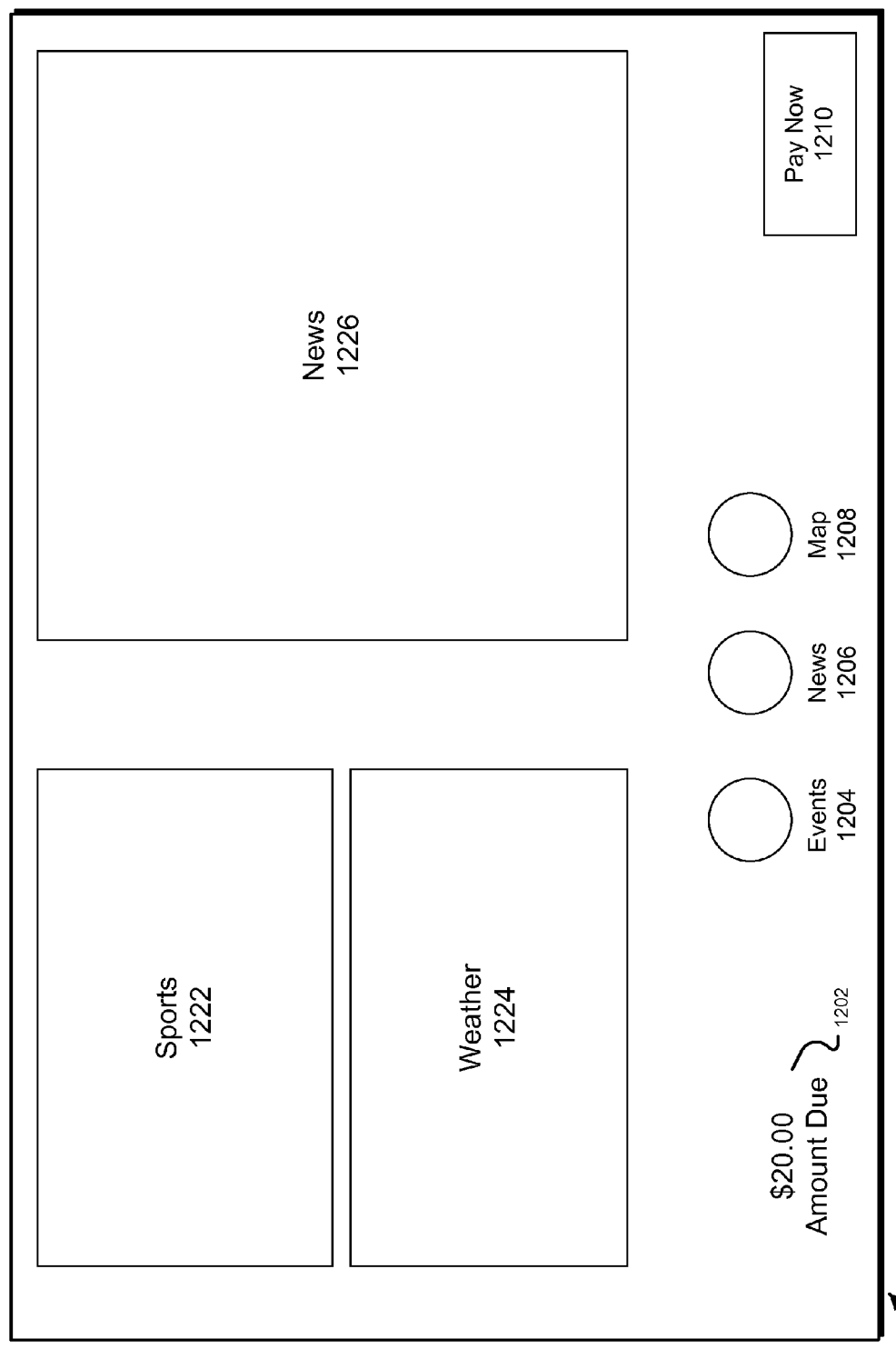

FIG. 12B is a diagram of an example news view 1221 displayed by a customer application on the customer facing device. The news view 1221 can display a sports section 1222 with the most recent sports statistics or game information, a weather section 1224 with information about the local weather, or a news section 1226 with the most recent news. By selecting any entry in the sections, the customer can learn more information about the entry selected. The customer facing device receives a selection of an entry and sends a request for more information to the payment service system 708 or another system that has information about the entry. The customer facing device can receive a response including more information about the entry and can display more information about the entry in a new view. In some implementations, the customer can customize the sections displayed. For example, the customer can choose to view a stocks section or a social network section. In some implementations, if the customer "swipes and rides", the application retrieves the customer's identity and loads the previously customized sections associated with the identity. The customer can also switch views and "Pay Now" as described above.

Figure 12C:
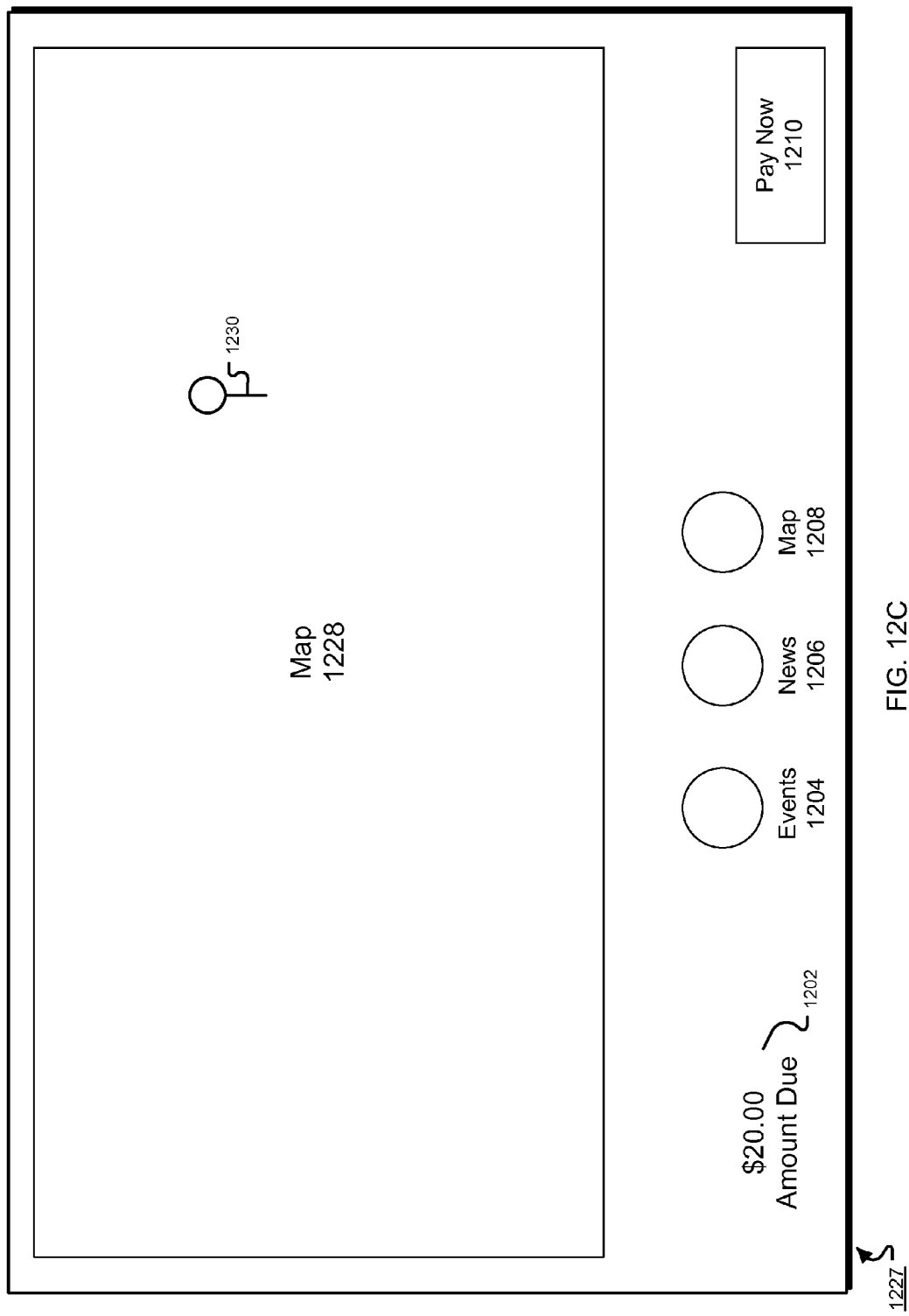

FIG. 12C is a diagram of an example maps view 1227 displayed by a customer application on the customer facing device. In some implementations, the customer facing device can obtain its location, e.g., using GPS. The maps view 1227 can display a map 1228 around the current location 1230 of the customer facing device. Once the maps view 1227 is selected, the customer facing device can send its location, e.g., using GPS, to the payment service system 708 or another system, e.g., a Maps Application Program Interface. The customer facing device can receive data that enables the device to display a map to a customer. For example, if the customer application is implemented in a taxi environment, the customer facing device can provide a map 1228 that displays a geographic region around the device's current location, which can be moving because the device is in a mobile vehicle. In some implementations, the map 1228 displays the cross streets of the current location (e.g., King Street & 4th Street) and the bus lines nearby (e.g., N, K, T). The customer can also interact with the map 1228 by zooming in or zooming out. The customer can also switch views and "Pay Now" as described above.

FIG. 13 is a diagram of an example tip view 1300 displayed by a customer application on the customer facing device for obtaining a tip. The tip view 1300 allows the customer to choose the amount of tip the customer wants to leave the merchant at the end of the transaction. An instruction 1302 saying "How much would you like to tip?" can direct the customer to select one of the options 1304 provided by the application. The customer can select 0%, 10%, 15%, 20%, or enter in a custom percentage. The application can display the actual amount of money the percentage tip translates to under the percentage amount. After selecting a tip amount, the customer can invoke the "Continue" button 1306 to continue the payment process. The customer facing device then calculates the additional tip (if any) and adds it to the original transaction amount to present a final payment amount to the customer.

Figure 14:
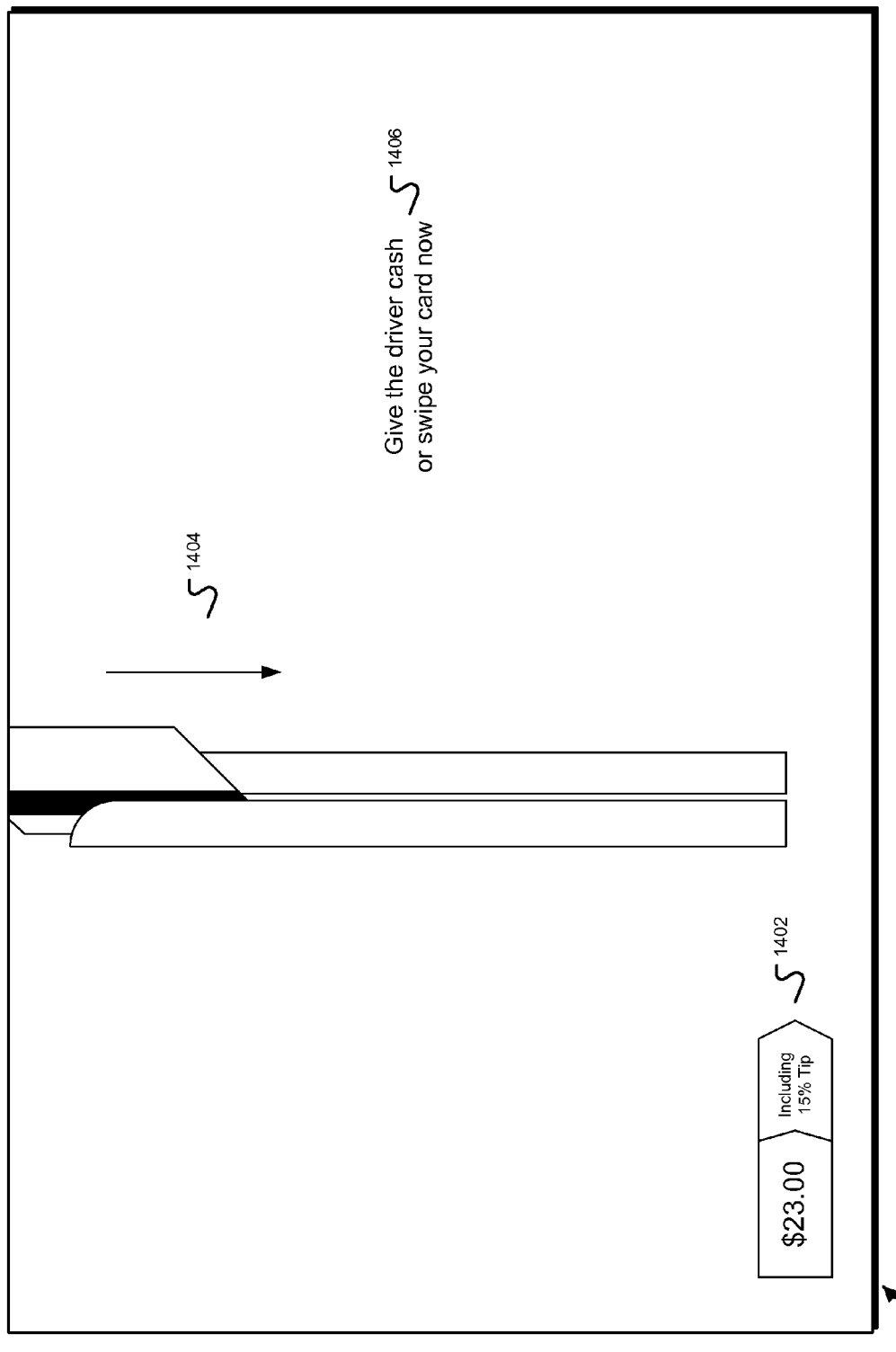

FIG. 14 is a diagram of an example payment view 1400 displayed by a customer application on the customer facing device for obtaining payment. For example, if the customer application is implemented in a taxi environment, the payment view 1400 can include instructions to "Give the driver cash or swipe your card now" 1406. An animation 1404 can instruct the customer how to pay the merchant by displaying a physical swiping motion at the card reader. A status bar 1402 can display which steps have been completed by the customer. Upon swiping a card, the device processes the card data and can cause the customer application to display the next step in the payment process.

Figure 15:
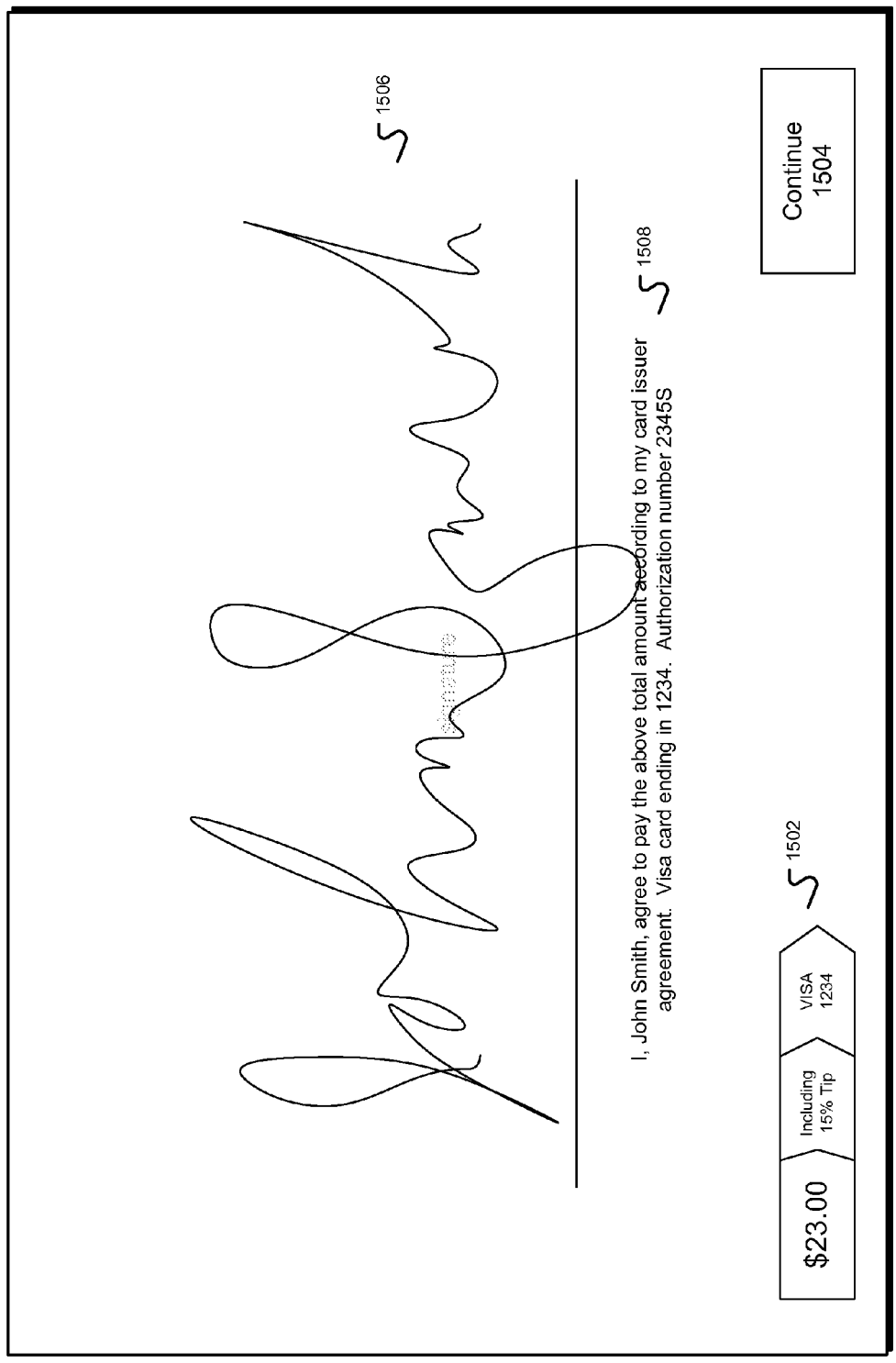

FIG. 15 is a diagram of an example signature view 1400 displayed by a customer application on the customer facing device for obtaining a signature. The signature view 1500 can instruct the customer to provide a signature on the customer facing device. For example, a customer named John Smith can sign the signature 1506 on the customer facing device, e.g., a tablet computer, using the customer's finger. Detailed information 1508 can be displayed under the signature 1506 to accurately confirm the customer's payment information. A status bar 1502 can display which steps have been completed by the customer. The customer can continue the payment process by invoking the "Continue" button 1504. The customer facing device can store the signature to be sent as part of the distributed payment transaction to the payment service system 708.

Figure 16:
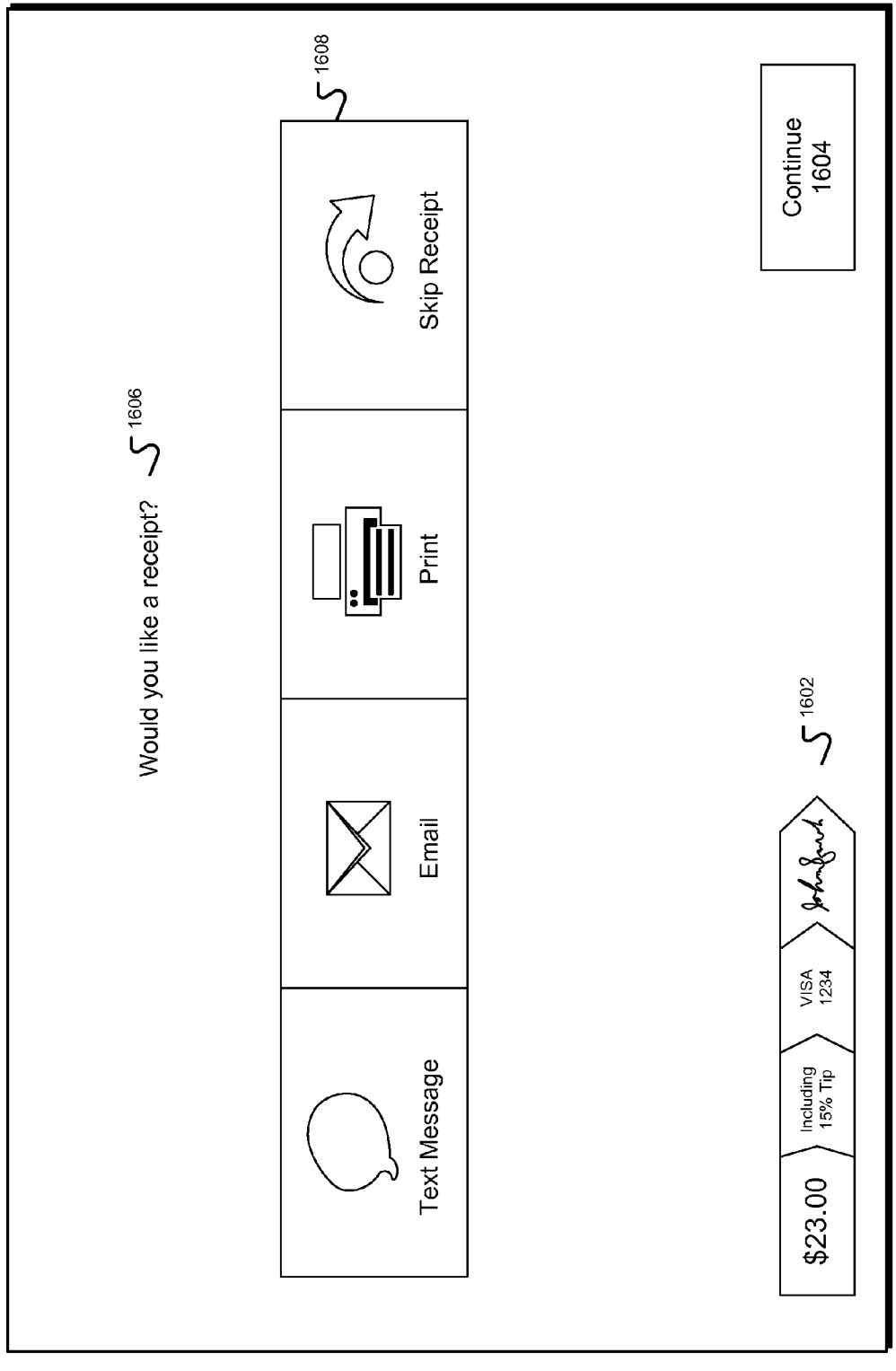

FIG. 16 is a diagram of an example receipt view 1600 displayed by a customer application on the customer facing device for obtaining a receipt. The receipt view 1600 allows the customer to choose the preferred delivery method for the receipt for the transaction. An instruction "Would you like a receipt?" 1606 can direct the customer to select a delivery method for the receipt. In some implementations, a customer selects from four options 1608. The receipt can be sent via text message, email, physical paper, e.g., printed by the merchant, or the customer can opt out of receiving a receipt. A status bar 1602 can display which steps have been completed by the customer. The customer can continue the payment process by invoking the "Continue" button 1604. The customer facing device can then include this preferred delivery method in its communication with the payment service system 708.

Figure 17:
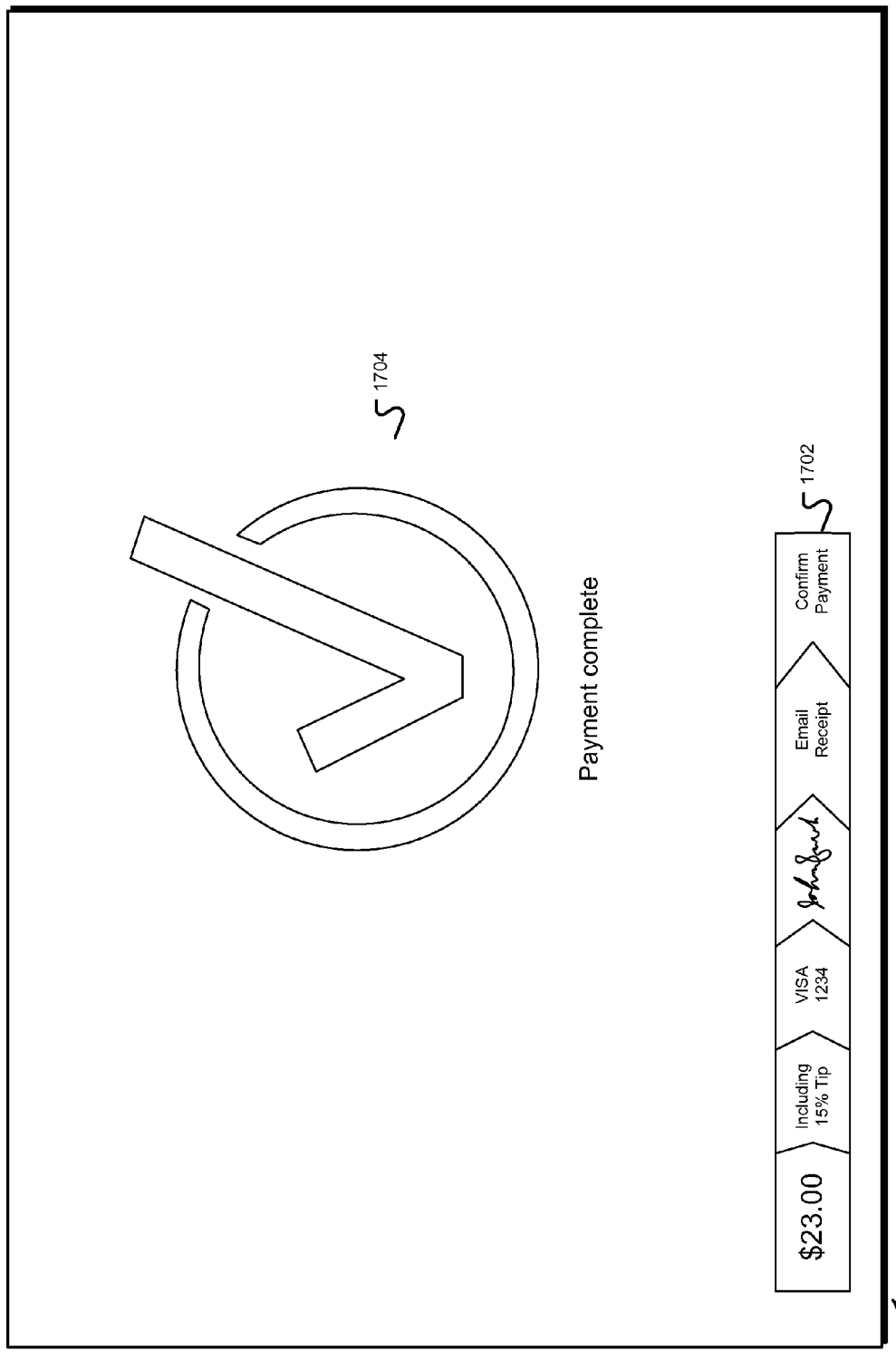

FIG. 17 is a diagram of an example final view 1700 displayed by a customer application on the customer facing device for displaying confirmation of the transaction. The customer facing device can display the final view 1700 once the customer facing device receives confirmation from the payment service system 708 that the transaction is approved. The customer facing device can receive confirmation from the merchant facing device or directly from the payment service system 708. An indication that the payment is complete 1704 confirms to the customer that the distributed payment transaction has been approved. A status bar 1702 can display which steps have been completed by the customer. At this point, the customer has completed the payment process.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, usage of wireless payment system may not be limited to a taxi environment but could also be applied to other environments, such as a restaurant. Moreover, usage of the techniques to establish secure communication may not be limited to mobile devices, but could also be applied to non-mobile or wired devices connected to a network. Although the swiping of a card through a reader is described above, other techniques for scanning a card, e.g., chip reading or near field communication, could be used to read data from the card.

What is claimed is:

1. A method of establishing secure communication between a first mobile computing device and a second mobile computing device, comprising:
    connecting the first mobile computing device to a server via a Wi-Fi hot spot;
    authenticating the first mobile computing device with the server;
    verifying that the server has a trusted certificate;
    sending a request to the server to securely communicate with the second mobile computing device that is connected to the Wi-Fi hot spot;
    sending the request to the second mobile computing device through the Wi-Fi hot spot;
    receiving a private key from the server;
    receiving data including a session key, the session key being encrypted;
    decrypting the data using the private key to obtain the session key; and
    establishing secure communication between the first mobile computing device and the second mobile computing device through the Wi-Fi hot spot, wherein establishing secure communication includes encrypting transmissions from the first mobile computing device using the session key and decrypting received transmissions from second mobile computing device using the session key.

2. The method of claim 1, wherein sending the request to the server includes sending a geographic location, current timestamp, a random number, or unique identification of the first mobile computing device.

3. The method of claim 1, wherein authenticating the first mobile computing device with the server includes authenticating by the first mobile computing device logging into the server.

4. The method of claim 1, further comprising:
    receiving in the first mobile computing device a list of mobile computing devices connected to the Wi-Fi hot spot.

5. The method of claim 1, wherein the session key expires after a predetermined amount of time.

6. The method of claim 1, wherein the session key expires when a mobile device connected to the Wi-Fi hot spot is disconnected.

7. The method of claim 1, wherein the mobile computing devices and Wi-Fi hot spot are in a vehicle.

8. The method of claim 1, wherein the mobile computing devices and Wi-Fi hot spot are in a restaurant.

9. The method of claim 1, wherein the trusted certificate is a Transport Layer Security (TLS) certificate.

10. A computer program product for establishing secure communication between a first mobile computing device and a second mobile computing device, tangibly encoded in a non-transitory computer readable media, comprising instructions to:
    connect the first mobile computing device to a server via the Wi-Fi hot spot;
    authenticate the first mobile computing device with the server;
    verify that the server has a trusted certificate;
    send a request to the server to securely communicate with the second mobile computing device that is connected to the Wi-Fi hot spot;
    send the request to the second mobile computing device through the Wi-Fi hot spot;
    receive a private key from the server;
    receive data including a session key, the session key being encrypted;
    decrypt the data using the private key to obtain the session key; and
    establish secure communication between the first mobile computing device and the second mobile computing device through the Wi-Fi hot spot, wherein establishing secure communication includes encrypting transmissions from the first mobile computing device using the session key and decrypting received transmissions from second mobile computing device using the session key.

11. A method of establishing secure communication between a first mobile computing device and a second mobile computing device, comprising:
- receiving, at a server, a first request from the first mobile computing device to securely communicate with the second mobile computing device via a Wi-Fi hot spot;
- verifying, at the server, that the first mobile computing device is trusted;
- generating, at the server, a public key and a private key based on a trusted certificate;
- sending the private key from the server to the first mobile computing device via the Wi-Fi hot spot;
- receiving, at the server, a second request from the second mobile computing device to securely communicate with the first mobile computing device;
- verifying, at the server, that the second mobile computing device is trusted; and
- sending the public key from the server to the second mobile computing device.

12. The method of claim 11, wherein verifying that the first mobile computing device is trusted comprises determining the first mobile computing device has established a session with the server.

13. The method of claim 12, further comprising:
- after verifying that the second mobile computing device is trusted, joining the second mobile computing device to the session.

14. The method of claim 11, wherein verifying that the second mobile computing device is trusted comprises determining the distance between the first mobile computing device and the second mobile computing device is within a predetermined distance.

15. The method of claim 11, wherein verifying that the second mobile computing device is trusted comprises determining a first unique identification of the first mobile computing device exists in a database.

16. The method of claim 11, wherein the trusted certificate is a TLS certificate.

17. The method of claim 11, wherein the public or private key expire after a predetermined amount of time.

18. The method of claim 11, wherein the public or private key expire when the first mobile computing device or the second mobile computing device disconnect from the Wi-Fi hot spot.

19. The method of claim 11, wherein the first request includes first metadata indicating a location, a timestamp, a random number, or a unique identification, and the second request includes second metadata matching the first metadata.

20. A computer program product for establishing secure communication between a first mobile computing device and a second mobile computing device, tangibly encoded in a non-transitory computer-readable media, comprising instructions to cause a processor to:
- receive, at a server, a first request from the first mobile computing device to securely communicate with the second mobile computing device via a Wi-Fi hot spot;
- verify, at the server, that the first mobile computing device is trusted;
- generate, at the server, a public key and a private key based on a trusted certificate;
- send the private key from the server to the first mobile computing device via the Wi-Fi hot spot;
- receive, at the server, a second request from the second mobile computing device to securely communicate with the first mobile computing device;
- verify, at the server, that the second mobile computing device is trusted; and
- send the public key from the server to the second mobile computing device.

21. A method of establishing secure communication between a first mobile computing device and a second mobile computing device, comprising:
- receiving a request from the first mobile computing device to securely communicate with the second mobile computing device via a Wi-Fi hot spot;
- sending the request to a server via the Wi-Fi hot spot;
- verifying that the server has a trusted certificate;
- receiving a public key from the server;
- generating a session key;
- encrypting the session key with the public key;
- sending the encrypted key to the first mobile computing device via the Wi-Fi hot spot; and
- establishing secure communication between the first mobile computing device and the second mobile computing device through the Wi-Fi hot spot, wherein establishing secure communication includes encrypting transmissions from the second mobile computing device using the session key and decrypting received transmissions from first mobile computing devices using the session key.

22. The method of claim 21, wherein the request includes a geographic location, current timestamp, a random number, or unique identification of the first mobile computing device.

23. The method of claim 21, wherein the session key expires after a predetermined amount of time.

24. The method of claim 21, wherein the session key expires when a mobile device connected to the Wi Fi hot spot is disconnected.

25. The method of claim 21, wherein the mobile computing devices and Wi-Fi hot spot are in a vehicle.

26. The method of claim 21, wherein the mobile computing devices and Wi-Fi hot spot are in a restaurant.

27. The method of claim 21, wherein the trusted certificate is a Transport Layer Security (TLS) certificate.

28. A computer program product for establishing secure communication between a first mobile computing device and a second mobile computing device, tangibly encoded in a non-transitory computer readable media, comprising instructions for causing a processor to:
- receive a request from the first mobile computing device to securely communicate with the second mobile computing device via a Wi-Fi hot spot;
- send the request to a server via the Wi-Fi hot spot;
- verify that the server has a trusted certificate;
- receive a public key from the server;
- generate a session key;
- encrypt the session key with the public key;
- send the encrypted key to the first mobile computing device via the Wi-Fi hot spot; and
- establish secure communication between the first mobile computing device and the second mobile computing device through the Wi Fi hot spot, wherein the instructions to establish secure communication include instructions to encrypt transmissions from the second mobile computing device using the session key and decrypt received transmissions from first mobile computing devices using the session key.

* * * * *

UNITED STATES PATENT AND TRADEMARK OFFICE
CERTIFICATE OF CORRECTION

PATENT NO. : 8,494,165 B1  Page 1 of 1
APPLICATION NO. : 13/353156
DATED : July 23, 2013
INVENTOR(S) : Diogo Monica et al.

It is certified that error appears in the above-identified patent and that said Letters Patent is hereby corrected as shown below:

On the title page, Item (74)

Page 1, Column 2, (Attorney, Agent, or Firm) Line 1, delete "Richarson" and insert -- Richardson --

Signed and Sealed this
First Day of October, 2013

Teresa Stanek Rea
*Deputy Director of the United States Patent and Trademark Office*